US008249422B2

(12) United States Patent
Narahara et al.

(10) Patent No.: US 8,249,422 B2
(45) Date of Patent: Aug. 21, 2012

(54) CONTENT USAGE SYSTEM, CONTENT USAGE METHOD, RECORDING AND PLAYBACK DEVICE, CONTENT DELIVERY METHOD, AND CONTENT DELIVERY PROGRAM

(75) Inventors: Tatsuya Narahara, Kanagawa (JP); Shunji Yoshimura, Tokyo (JP); Sho Murakoshi, Tokyo (JP)

(73) Assignee: Sony Corporation (JP)

( * ) Notice: Subject to any disclaimer, the term of this patent is extended or adjusted under 35 U.S.C. 154(b) by 1010 days.

(21) Appl. No.: 12/283,706

(22) Filed: Sep. 15, 2008

(65) Prior Publication Data

US 2009/0077046 A1 Mar. 19, 2009

(30) Foreign Application Priority Data

Sep. 18, 2007 (JP) ................. P2007-240366

(51) Int. Cl.
*H04N 9/80* (2006.01)
(52) U.S. Cl. ........................................ 386/248
(58) Field of Classification Search ........................ None
See application file for complete search history.

(56) References Cited

FOREIGN PATENT DOCUMENTS

JP 2006-148284 A 6/2006

*Primary Examiner* — William C Vaughn, Jr.
*Assistant Examiner* — Eileen Adams
(74) *Attorney, Agent, or Firm* — Lerner, David, Littenberg, Krumholz & Mentlik, LLP

(57) ABSTRACT

A content usage system includes a recording and playback device and a portable electronic device mutually connected via a network. When the recording and playback device receives a certain command while outputting digital content, that content is converted into transfer content suitable for use with the portable electronic device, and then stored with metadata indicating that the content is transfer content. Using the metadata, the recording and playback device is able to generate and transmit a list of transfer content upon request from the portable electronic device. Using the list, the user of the portable electronic device then selects desired transfer content from the list and sends a transfer content request. In response, the recording and playback device transmits the selected transfer content to the portable electronic device, thereby making the content available for use on the portable electronic device.

19 Claims, 13 Drawing Sheets

FIG. 4

EXEMPLARY LAYOUT OF TRANSFER CONTENT FILE

| METADATA PORTION | | |
|---|---|---|
| FILENAME | DATE RECORDED | SOURCE |
| PROGRAM TITLE | | |
| PERFORMERS | | |
| DETAILED PROGRAM INFO | | |
| USER TAGS | | |
| THUMBNAIL | | |
| TRANSFER MARK | | |
| RECORD START TIME | RECORD STOP TIME | |

CONTENT DATA PORTION: CONTENT DATA (ADJUSTED AND CONVERTED FOR TRANSFER)

DEVICE INFORMATION INPUT

PORTABLE DEVICE TABLE

| ID | FOLDER NAME | VIDEO SIZE | COMPRESSION METHOD | OTHER |
|---|---|---|---|---|
| AAAA | REMOTE VIEWING 1 | SMALL | × × | |
| BBBB | REMOTE VIEWING 2 | MEDIUM | × × | |
| ⋮ | ⋮ | ⋮ | ⋮ | ⋮ |

DEVICE SELECTION INPUT

CONTENT USAGE SYSTEM, CONTENT USAGE METHOD, RECORDING AND PLAYBACK DEVICE, CONTENT DELIVERY METHOD, AND CONTENT DELIVERY PROGRAM

CROSS-REFERENCES TO RELATED APPLICATIONS

The present application claims priority from Japanese Patent Application No. JP 2007-240366, filed in the Japanese Patent Office on Sep. 18, 2007, the entire contents of which is incorporated herein by reference.

BACKGROUND OF THE INVENTION

1. Field of the Invention

The present invention relates to a system, a method, and a program able to make use of various digital content using a portable electronic device such as a mobile phone or handheld video game console.

2. Description of the Related Art

The use of a variety of portable electronic devices that are physically carried around by users is becoming more widespread. Such devices include mobile phones, portable music players, and handheld video game consoles. Such portable electronic devices are capable of using digital content at any time by accessing a content delivery server and downloading a variety of target digital content, such as music data, in advance. A portable electronic device may access a content delivery server directly if the device is provided with communications functions, or via a personal computer if the device is not provided with communications functions.

In addition, not only is digital content downloaded from a content delivery server, but a variety of digital content may also be transferred from a personal computer to a portable electronic device, the digital content in this case being saved on a recording medium provided in the personal computer or on a recording medium that has been loaded into the personal computer.

However, searching for target digital content from among a large amount of digital content and then downloading the target digital content to a portable electronic device can take considerable effort and time. For this reason, JP-A-2006-148284 discloses technology that automatically allows a user's preferred digital content to be used on a portable music player or portable media player. In order to do so, digital content usage history is retrieved for a portable music player or portable media player, and according to the digital content usage history, digital content that matches the user's preferences is automatically readied for use by being recorded on a recording medium housed inside the portable music player or portable media player.

SUMMARY OF THE INVENTION

The technology disclosed in JP-A-2006-148284 is highly effective for portable audio players and portable media players that routinely use digital content. However, in many cases the digital content that users would like to be able to use on a portable electronic device is digital content that is used at home.

For example, a user may be viewing a broadcast television program and find a particular segment interesting, and then want to be able to use the segment on a portable electronic device. Alternatively, if the broadcast television program provides important information, the user may want to be able to use the program on a portable electronic device and thereby be able to view and check the important information at any time. It should be appreciated that viewing of content is herein taken to encompass watching video, listening to audio, reading text, and other, similar actions.

Furthermore, while it is common for music content to be available for use on a per-song basis, in the case of AV (audio-visual) content such as broadcast television programs, wherein both audio and video are played back simultaneously, the entirety of the AV content or only a specific portion thereof may be available.

Moreover, although the user may want to have certain digital content available for use on a portable electronic device, the user may also consider that the particular digital content may not actually be used. Thus, the user may try to transfer all desired digital content to the portable electronic device. In this case, there is a high possibility that storage space will be insufficient, even with a portable electronic device that contains a large amount of internal memory.

The present invention, devised in light of the foregoing, enables digital content desired by a user to be quickly and easily made available for use on a portable electronic device, without involving considerable time or effort.

A content usage system in accordance with a first embodiment of the present invention includes a recording and playback device and a portable electronic device, the recording and playback device being provided with functions to record supplied digital content onto a recording medium and functions to play back digital content recorded onto the recording medium, and the portable electronic device being provided with functions to receive and play back digital content provided thereto. The recording and playback device and the portable electronic device are connected via a predetermined network.

The recording and playback device of the content usage system in accordance with the first embodiment of the present invention includes the following. A receiver receives command input indicating that digital content is to be transferred to the portable electronic device when the recording and playback device outputs digital content that has been supplied or previously recorded on a recording medium. When the command input is received via the receiver, a converter converts the digital content being output into transfer content that is to be transferred to the portable electronic device, the conversion being conducted from a data position based on the time when the command input was received. A recorder records, on a recording medium, the transfer content acquired as a result of converting the digital content using the converter. A metadata processor generates and appends metadata to the transfer content recorded to the recording medium, the metadata including information indicating that the content is for transfer to a another device. A list request receiver receives, from the portable electronic device, a request to provide a list of the transfer content. Upon receiving a list request via the list request receiver, a list generator generates a list of the transfer content, the list being generated on the basis of the metadata that was appended to the transfer content by the metadata processor. A list transmitter transmits the list of transfer content that was generated by the list generator to the portable electronic device that originally issued the list request. A content provision request receiver receives, from the portable electronic device, a request to provide transfer content. Upon receiving the request to provide transfer content via the content provision request receiver, a content transmitter transmits the transfer content that was recorded to the recording medium to the portable electronic device that originally issued the content provision request.

The portable electronic device of the content usage system in accordance with the first embodiment of the present invention includes the following. A list request transmitter transmits, to the recording and playback device, a request to provide a list of transfer content. A list receiver receives the list of transfer content transmitted by the recording and playback device. A display controller conducts control such that the list received by the list receiver is displayed on the display screen of a display element. A selection receiver receives input selecting target transfer content from among those appearing in the list of transfer content displayed on the display screen of the display element as a result of the control conducted by the display controller. A content provision request transmitter transmits a request to provide transfer content that has been selected by the selection input received via the selection receiver. A digital content receiver receives transfer content transmitted from the recording and playback device and makes the received transfer content available for use.

As a result of the content usage system in accordance with the first embodiment of the present invention, when the recording and playback device is outputting digital content and command input is received via the receiver indicating that the digital content is to be transferred, the digital content being output is converted by the converter into transfer content that is to be transferred to the portable electronic device, the conversion being conducted from a data position based on the time when the command input is received. The converted transfer content is then recorded on a recording medium by the recorder. In addition, the metadata processor appends metadata to the transfer content that indicates that the content is for transfer to another device.

Subsequently, upon receiving a request from a portable electronic device for a list of transfer content via the list request receiver, the recording and playback device generates, via the list generator, a list of transfer content on the basis of the transfer content metadata. The recording and playback device then transmits the generated list to the portable electronic device that originated the request via the list transmitter.

In the portable electronic device, the list of transfer content from the recording and playback device is displayed on the display screen of a display element by the display controller. From this displayed list, a selection of target transfer content is received via the selection receiver, and a request to provide the selected transfer content is transmitted to the recording and playback device via the content provision request transmitter.

Upon receiving the content provision request from the portable electronic device via the content provision request receiver, the recording and playback device retrieves the requested transfer content from a recording medium, and then transmits this transfer content to the portable electronic device via the content transmitter. The transfer content is then received and made available for use via the digital content receiver of the portable electronic device.

As a result of the above, only the portions of the digital content that the user desires to transfer are saved on a recording medium, such content being saved as transfer content that has been converted according to the portable electronic device that is the transfer destination. Furthermore, a list of the transfer content is provided to the portable electronic device. Using the list of transfer content, the user is able to quickly find and request target transfer content, which is then received from the recording and playback device. Consequently, digital content desired by the user is quickly and easily made available for use on a portable electronic device.

In addition, a content usage system in accordance with a second embodiment of the present invention is similar to the content usage system in accordance with the first embodiment described above, but wherein the converter of the recording and playback device also converts digital content according to the screen size of the portable electronic device that is the transmission destination, such conversion being conducted when the digital content includes video data.

As a result of the content usage system in accordance with the second embodiment of the present invention, when digital content contains video data, the converter of the recording and playback device converts the video size of the digital content according to the portable electronic device to be provided with the digital content.

In so doing, transfer content is received and made available for use without converting the video size on the portable electronic device. Consequently, digital content that the user desires for use on a portable electronic device is quickly and easily made available on the portable electronic device.

In addition, a content usage system in accordance with a third embodiment is similar to the content usage system in accordance with the first embodiment, but wherein the converter of the recording and playback device also uses data compression techniques when converting digital content.

As a result of the content usage system in accordance with the third embodiment of the present invention, the converter of the recording and playback device converts digital content using a data compression technique that varies according to the portable electronic device to be provided with the digital content.

In so doing, transfer content is received and made available for use without compressing the digital content on the portable electronic device. Consequently, digital content that the user desires for use on a portable electronic device is quickly and easily made available on the portable electronic device.

In addition, a content usage system in accordance with a fourth embodiment of the present invention is similar to the content usage system in accordance with the first embodiment, but with the following modifications.

The recording and playback device of the content usage system in accordance with the fourth embodiment of the present invention is additionally provided with a configuration input receiver and configuration information saver. The configuration input receiver receives configuration input for configuring the portable electronic device that is the transfer destination for the transfer content, the configuration input including identification information for the portable electronic device. The configuration information saver saves information in accordance with the configuration input received via the configuration input receiver.

Furthermore, on the basis of the information saved by the configuration information saver, the converter converts digital content according to the portable electronic device set as the transfer destination device, and the recorder records to the recording medium the transfer content from the converter, the transfer content being recorded as being for use with the portable electronic device set as the transfer destination device.

Furthermore, the list request receiver of the content usage system in accordance with the fourth embodiment receives a list request that contains identification information for the portable electronic device that originated the request. On the basis of the identification information for the originating portable electronic device that was received via the list request receiver, the list generator generates a list of transfer content by referring to the metadata of the transfer content converted for use with the portable electronic device specified by the identification information.

Furthermore, the list request transmitter of the portable electronic device of the content usage system in accordance with the fourth embodiment transmits a request for a list of transfer content that also includes identification information for that portable electronic device.

As a result of the content usage system in accordance with the fourth embodiment of the present invention, the recording and playback device receives configuration input from the transfer destination device via the configuration input receiver, and information corresponding to the configuration input is then saved by the configuration information saver. Subsequently, the converter performs conversion processing according to the transfer destination device specified in the configuration information. In addition, the recorder records transfer content to the recording medium specified as being for use with the transfer destination device specified in the configuration information.

Additionally, the portable electronic device transmits a transfer content list request that also contains self-identifying information, the list request being subsequently received by the list request receiver of the recording and playback device. On the basis of the identification information contained in the list request, the list generator generates a list of transfer content converted for use with the portable electronic device that originated the request. This list is then transmitted to the originating portable electronic device via the list transmitter.

As a result of the above, a portable electronic device is able to acquire a list of transfer content that has been converted for use with that device, and is furthermore able to quickly receive the converted transfer content. Consequently, even if a plurality of users use the recording and playback device, the digital content that each user desires for use on a respective portable electronic device is quickly and easily made available on those portable electronic devices on a per-user basis.

As a result of the present invention, digital content that a user desires for use on a portable electronic device is quickly and easily made available on that portable electronic device, without involving considerable time or effort. In other words, portable viewing of digital content is made easier, and usage of digital content via portable electronic devices is expanded.

BRIEF DESCRIPTION OF THE DRAWINGS

FIG. 4 is a diagram illustrating a specific example of transfer content generated by the DVR 100;

DESCRIPTION OF THE PREFERRED EMBODIMENTS

Hereinafter, an embodiment of the present invention will be described with reference to the accompanying drawings. By way of example, the embodiment described hereinafter includes a digital video recorder (DVR) as the recording and playback device, and a mobile phone as the portable electronic device.

Overview of Content Usage System

Figure 1:
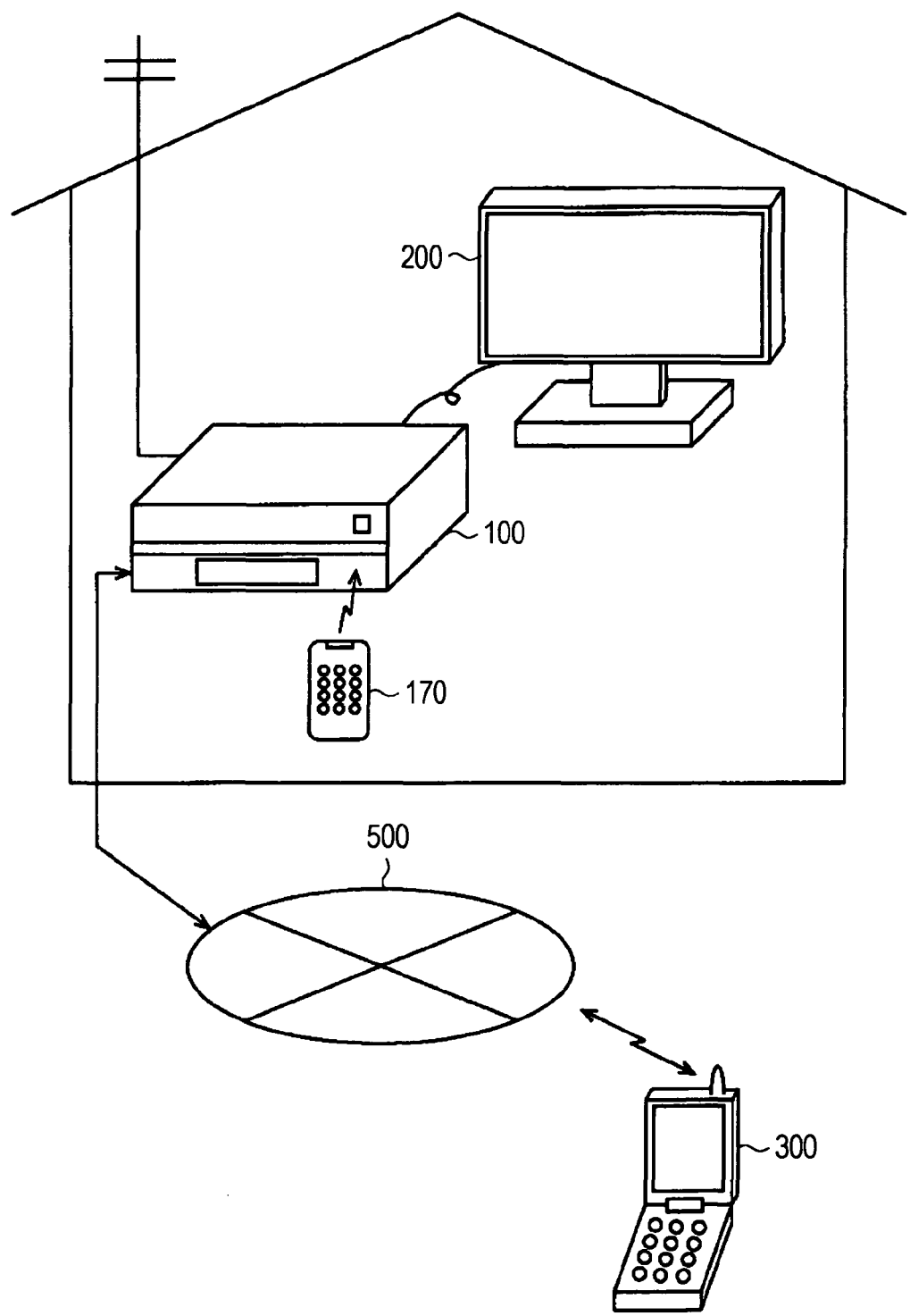
FIG. 1 is a diagram for explaining a content usage system in accordance with an embodiment of the present invention.

FIG. 1 is a diagram for describing an overview of the content usage system in accordance with the present embodiment. As shown in FIG. 1, the content usage system in accordance with the present embodiment includes a DVR 100, installed for use in a private home or similar location, and a mobile phone 300. The DVR 100 and the mobile phone 300 are connected to each other via a wide-area network (WAN) 500 such as a telephone network or the Internet.

Connected to the DVR 100 is a television monitor 200. The DVR 100 will be described later in more detail, but in general terms, the DVR 100 records content to an internal hard disk by receiving a broadcast television signal and selecting a channel therefrom. In addition, the DVR 100 creates output signals (audio signals and video signals) by demodulating a selected channel of a received broadcast television signal, and then supplies the output signals to the television monitor 200.

In addition, the DVR 100 accesses a content delivery server available via the wide-area network (WAN) 500 and receives target content from the content delivery server. The DVR 100 may then record the received content to an internal hard disk, or demodulate the received content to create output signals (audio signals and video signals), which are subsequently supplied to the television monitor 200.

The DVR 100 is also provided with ports for connection to external devices, thereby enabling the DVR 100 to receive digital content supplied from various external devices. The DVR 100 may then record the received content to an internal hard disk, or demodulate the received content to create output signals (audio signals and video signals), which are subsequently supplied to the television monitor 200.

In addition, the DVR 100 is able to retrieve and demodulate digital content previously recorded to the internal hard disk, the demodulated content used to create output signals subsequently supplied to the television monitor 200.

In this way, the DVR of the present embodiment is able to receive digital content supplied via various routes, such digital content being recorded to an internal hard disk, or demodulated to create output signals subsequently supplied to the television monitor 200. Furthermore, the DVR 100 is capable of creating output signals by demodulating digital content previously recorded to the internal hard disk, the output signals being subsequently supplied to the television monitor 200.

The television monitor 200 is provided with both a display element, such as a liquid crystal display (LCD), an organic electroluminescent panel (OEL panel), or a cathode ray tube (CRT), as well as one or more speakers. The television monitor 200 is able to display video corresponding to a supplied video signal on the display screen of the display element, while also emitting audio corresponding to a supplied audio signal from the one or more speakers.

Consider the case wherein video and/or audio corresponding to particular digital content is made to be output from the DVR 100 for use with the television monitor 200, and furthermore wherein content desired for use with the mobile phone 300 is also provided. In this case, the user inputs a command to transfer the content for use with the mobile phone 300 by operating a predetermined button or key (e.g., a button labeled "Mark for Transfer") that is provided on a remote control 170 operable with the DVR 100.

Upon receiving the command input, the DVR 100 converts the digital content into transfer content in a format suitable for transfer to the mobile phone 300, and then records the converted transfer content to the internal hard disk. In this case, metadata is also appended to the transfer content in the DVR 100, the metadata containing information indicating that the content is transfer content. In this way, the DVR 100 creates transfer content to be provided to the mobile phone 300, and saves this content to the internal hard disk provided in the DVR 100.

Subsequently, when the user of the mobile phone 300 desires the transfer content saved in the DVR 100 for use with the mobile phone 300, the user operates the mobile phone 300 so as to access the DVR 100 via the WAN 500 and transmit to the DVR 100 a request for a list of transfer content.

In response, the DVR 100 generates a list of transfer content by selecting, from among the digital content saved in the internal hard disk, only the content having appended metadata that includes information indicating that the particular content is transfer content. The DVR 100 then transmits the generated list to the mobile phone 300 that originated the request.

The mobile phone 300 receives the list of transfer content transmitted from the DVR 100 in response to the request from the mobile phone 300. By subsequently displaying the received list on the display screen of a built-in, the user of the mobile phone 300 is able to ascertain what transfer content is receivable by the mobile phone 300.

Subsequently, using the mobile phone 300, the user selects desired transfer content to receive from the DVR 100 via the displayed list of transfer content. The mobile phone 300 then creates a request for the provision of the selected transfer content, and transmits this request to the DVR 100.

Upon receiving the transfer content provision request from the mobile phone 300, the DVR 100 retrieves the requested transfer content from the internal hard disk, and then transmits the retrieved content to the mobile phone 300 that originated the content provision request. Subsequently, the mobile phone 300 that originated the provision request successively receives and demodulates the requested transfer content transmitted from the DVR 100, thereby making the transfer content available for playback by the user via the display element and one or more speakers included in the mobile phone 300.

In this way, in the content usage system in accordance with the present embodiment, when a user using digital content by means of a DVR 100 decides that he or she would like to transfer the content for use on a portable electronic device, the user performs a predetermined operation by means of a remote control 170. In so doing, transfer content to be transferred to the portable electronic device is generated from the digital content currently in use and then saved. The generated transfer content can then be provided in response to a request from a mobile phone 300.

In this case, the DVR 100 is able to generate a list of transfer content and then provide this list to the mobile phone 300. Since only information regarding available transfer content is provided to the mobile phone 300, target transfer content can be provided quickly, even if a large amount of digital content has been recorded to the hard disk of the DVR 100.

Exemplary Configuration of the DVR 100

Figure 2:
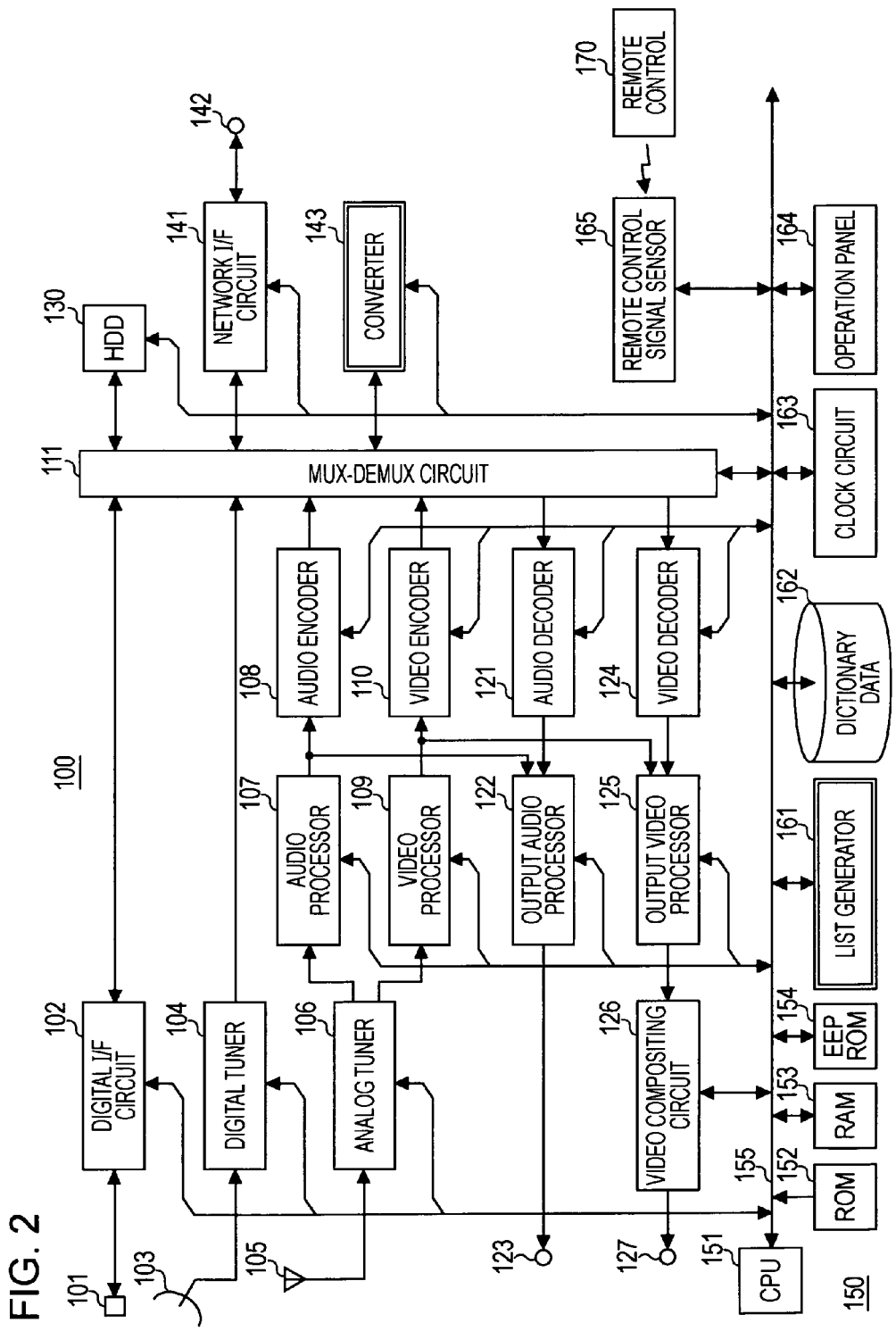
FIG. 2 is a block diagram for explaining a DVR, herein implemented as an embodiment of the recording and playback device of the present invention.

An exemplary configuration of the DVR 100 illustrated in FIG. 1 will now be described. FIG. 2 is a block diagram for describing an exemplary configuration of the DVR 100 in accordance with the present embodiment. As shown in FIG. 2, the DVR 100 in accordance with the present embodiment is provided with an input/output subsystem made up of a digital input/output port 101 and a digital interface circuit (hereinafter abbreviated as digital I/F circuit) 102.

The DVR 100 is also provided with an input subsystem made up of a digital receiving antenna 103 and a digital tuner 104 for receiving digital broadcasts, as well as an analog receiving antenna 105 and an analog tuner 106 for receiving analog broadcasts. Additionally, the analog tuner 106 is provided with an audio processor 107, an audio encoder 108, a video processor 109, and a video encoder 110.

The DVR 100 is also provided with an output subsystem made up of an audio decoder 121, an output audio processor 122, an audio output port 123, a video decoder 124, an output video processor 125, a video compositing circuit 126, and a video output port 127. Additionally, the DVR 100 is provided with a multiplexing-demultiplexing circuit (mux-demux circuit) 111 that performs multiplexing and demultiplexing of data, as well as a hard disk drive (HDD) 130 that includes a hard disk having a storage capacity of several hundred gigabytes, for example.

Furthermore, the DVR 100 in accordance with the present embodiment is also provided with, for example, a network interface circuit (hereinafter abbreviated as network I/F circuit) 141 and a network port 142 for connecting to a wide-area network such as the Internet. The DVR 100 is thus able to both transmit and receive a variety of information via the wide-area network. The DVR 100 in accordance with the present embodiment is also provided with a converter 143 for converting regular digital content for use with the DVR 100 into transfer content. The converter 143 will be described later in further detail.

The DVR 100 in accordance with the present embodiment is also provided with a controller 150 that controls the respective components of the DVR 100. As shown in FIG. 2, the controller 150 herein is a microprocessor having a central processing unit (CPU) 151, read-only memory (ROM) 152, random access memory (RAM) 153, and electrically erasable and programmable ROM (EEPROM) 154 connected via a CPU bus 155.

The CPU 151 generates control signals by executing a program, to be hereinafter described, that is saved in the ROM 152 or similar memory. The CPU 151 primarily controls the DVR 100 by supplying respective components with such control signals, as well as by processing data received from respective components. As described above, the ROM 152 saves various programs executed by the CPU 151 as well as data used in processing.

The RAM 153 is primarily used as a work area, and temporarily stores the results of various processing, for example. The EEPROM 154 is non-volatile memory, and is used to save data that should be retained even if power is cut to the DVR 100 in accordance with the present embodiment. For example, the EEPROM 154 may save various configuration parameters and processing results, or new programs that increase device functionality, such programs being provided via a network or other means.

Additionally connected to the controller 150 are a list generator 161, dictionary data memory 162, a clock circuit 163, a operation panel 164, and a remote control signal sensor 165. When the DVR 100 receives a request for a list of transfer content from the mobile phone 300, the list generator 161 operates according to control by the controller 150 so as to generate a list of transfer content by referring to the metadata for the digital content saved to the hard disk of the HDD 130, as described earlier. The generated list is then provided to the mobile phone that originated the request.

The dictionary data memory 162 is used to save data from various dictionaries, such as dictionaries of places and proper names. The clock circuit 163 is provided with calendar functions, and is able to both provide the current date, weekday, and time, as well as measure (i.e., count) elapsed time over a given period. The operation panel 164 is provided with various buttons, switches, knobs, or similar operational means, through which various operational input (i.e., command input) is received from a user. The operation panel 164 converts received operational input into electrical signals and supplies these signals to the controller 150.

The remote control signal sensor 165 senses a remote control signal such as an infrared signal emitted from the remote control 170. The remote control signal sensor 165 converts detected signals into electrical signals and supplies these signals to the controller 150. The remote control 170 will be described later in more detail, but in general terms, the remote control 170 is provided with various operational buttons, and in response to user operations, the remote control 170 generates and transmits remote control signals such as infrared signals.

Operation While Recording

The operation of the DVR in accordance with the first embodiment when recording content will now be described. As described in the foregoing, the DVR in accordance with the present embodiment is able to record the following types of content to the hard disk of the HDD 130:

(1) digital content received via the digital input/output port 101 and the digital I/F circuit 102;

(2) digital broadcast television programs received as a result of the digital tuner 104 receiving a digital broadcast signal and selecting a signal channel therefrom; and (3) analog broadcast television programs received as a result of the analog tuner 106 receiving an analog broadcast signal and selecting a signal channel therefrom.

(1) Use of the Digital I/F Circuit 102

The digital input/output port 101 and the digital I/F circuit 102 conform to the Institute of Electrical and Electronics Engineers (IEEE) 1394 standard, the Universal Serial Bus (USB) standard, or a similar standard. Doing so enables external devices (such as a digital still camera or a digital video camera) provided with an interface in accordance with the same standard to be connected to the digital input/output port 101 and the digital I/F circuit 102.

Additionally, digital content may be received via the digital input/output port 101 and the digital I/F circuit 102 from external devices connected thereto. The received digital content may then be recorded to the HDD 130, or output after conversion into an analog video signal and/or analog audio signal. Such digital content includes data such as still image data, video data, audio data, and audio-visual (AV) data made up of audio data and video data synchronized for playback.

By way of example, a case will now be described wherein AV data provided by an external device is received and processed. AV data received via the digital input/output port 101 is first supplied to the digital I/F circuit 102. The digital I/F circuit 102 then processes the supplied AV data so as to convert the data into a format suitable for use by the DVR 100 in accordance with the present embodiment. The digital I/F circuit 102 also generates a transport stream (TS), wherein the data has been packetized and multiplexed. The TS is then supplied to the mux-demux circuit 111.

In the mux-demux circuit 111, additional control signals are analyzed or generated so as to form a TS in a format for recording to a hard disk. The TS is then recorded to the hard disk housed inside the HDD 130. More specifically, when the digital content is AV data, the TS may contain packetized and multiplexed audio data, video data, and additional data such as control data, for example.

In addition, the mux-demux circuit 111 extracts audio packets and video packets from the TS supplied from the digital I/F circuit 102. An audio elementary stream (ES) is formed from the extracted audio packets, while a video ES is formed from the video packets. Herein, the audio ES thus formed is supplied to the audio decoder 121, while the video ES is supplied to the video decoder 124. Furthermore, each packet contains an identifier (ID) such that the mux-demux circuit 111 is able to differentiate and extract audio data, video data, and other data such as control data as described above on the basis of respective packet identifiers.

The audio decoder 121 decodes the audio ES supplied thereto and thereby obtains baseband audio data, such data being subsequently supplied to the output audio processor 122. The output audio processor 122 processes the audio data supplied thereto using, for example, filter processing, fade processing, speech rate conversion processing, and digital-to-analog conversion processing. The output audio processor 122 thus generates an analog audio signal for output as a result, the signal being subsequently supplied to the audio output port 123.

In so doing, an audio signal is output via the audio output port 123, the audio signal corresponding to an audio ES that was obtained as a result of the mux-demux circuit 111 demultiplexing a TS supplied from the digital I/F circuit 102. In the present embodiment, audio corresponding to this audio signal is emitted from the one or more speakers of the television monitor 200 connected to the audio output port 123.

Meanwhile, the video decoder 124 decodes the video ES supplied thereto and thereby obtains baseband video data, such data being subsequently supplied to the output video processor 125. The output video processor 125 processes the supplied video data as appropriate using filter processing, for example, and then supplies the processed video data to the video compositing circuit 126.

The video compositing circuit 126 processes the video data supplied from the output video processor 125 so as to overlay or partially display text information, such as guidance or warning messages, supplied from the controller 150. In addition, the video compositing circuit 126 converts the video data into YC data (i.e., a luma-chroma signal) and also performs digital-to-analog conversion processing, thereby generating an analog video signal for output. The generated signal is then supplied to the video output port 127.

In so doing, a video signal is output via the video output port 127, the video signal corresponding to a video ES that was obtained as a result of the mux-demux circuit 111 demultiplexing a TS supplied from the digital I/F circuit 102. In the present embodiment, video corresponding to this video signal is displayed on the display screen of the television monitor 200 connected to the video output port 127.

In this way, digital content such as AV data received via the digital input/output port 101 and the digital I/F circuit 102 may be recorded to the hard disk of the HDD 130, or alternatively, an analog audio signal for playback and/or an analog video signal for playback may be generated from the digital content and supplied to an external device via the audio output port 123 and/or the video output port 127, whereby audio and/or video corresponding to the supplied analog signals is played back.

(2) Use of the Digital Tuner

The recording and playing back of digital content received as a result of the digital tuner 104 receiving a digital broadcast signal and selecting a signal channel therefrom will now be described. In the present embodiment, the digital tuner 104 is a digital tuner for the Japanese broadcasting satellite (BS) and communications satellite (CS) television systems, and is thus capable of receiving and selecting channels from BS digital broadcast signals and CS digital broadcast signals.

It should be appreciated that it is of course possible to receive and select a channel from a terrestrial digital broadcast television signal by providing a tuner for terrestrial digital television broadcasts. However, since such a tuner performs processing nearly identical to that of a tuner that receives and selects channels from a BS digital broadcast signal or CS digital broadcast signal, further description thereof is omitted from the present specification for the sake of brevity.

The digital broadcast signal received via satellite by the digital receiving antenna 103 is supplied to the digital tuner 104. The digital tuner 104 then receives and selects a channel from a target digital broadcast signal on the basis of a selection control signal supplied from the controller 150, the selection control signal corresponding to selection input from the user. The selected channel of the digital broadcast signal thus received is then supplied to the mux-demux circuit 111.

The digital broadcast signal is in TS format. More specifically, the digital broadcast signal is multiplexed signal of various packetized data for each channel. This data may include video data and audio data constituting a broadcast program, as well as various control data such as electronic program guide (EPG) data for generating an electronic program guide or program-specific information (PSI). Various other types of data may also be included.

In addition, each packet includes an identifier (ID). By means of respective packet identifiers, it is possible to extract PSI data and EPG data, as well as the video (image) packets and audio packets that constitute a particular program.

The mux-demux circuit 111 extracts PSI and EPG data from the TS supplied from the digital tuner 104. The extracted data is then supplied to the controller 150, whereby program selection is enabled and an electronic program guide is generated. The electronic program guide is output for display in response to user commands, thereby enabling the user to perform actions such as selecting programs and scheduling recordings via the electronic program guide. The PSI and EPG data may also be saved to the EEPROM 154, for example, or stored in a predefined region of the hard disk of the HDD 130 as appropriate. The stored data may then by retrieved for use by the controller 150 as appropriate.

In addition, when a command is issued to record a selected program, the mux-demux circuit 111 extracts the video packets and audio packets of the target program selected by the user, the packets being extracted from the TS supplied from the digital tuner 104. The mux-demux circuit 111 then generates a new TS made up of the extracted packets as well as corresponding control data. The new TS is then supplied to the HDD 130 and recorded to hard disk.

At the same time, the mux-demux circuit 111 also generates an audio ES from the audio packets of the target program that was extracted from the TS supplied from the digital tuner 104, and supplies this audio ES to the audio decoder 121. Additionally, the mux-demux circuit 111 generates a video ES from the video packets of the target program that was extracted from the TS, and supplies this video ES to the video decoder 124.

As described in the foregoing, the audio ES and the video ES are processed in the following way. The audio ES is decoded by the audio decoder 121 to obtain baseband audio data. The baseband audio data is then subjected to processing, such as filter processing, by the output audio processor 122, while also undergoing digital-to-analog conversion so as to generate an analog audio signal for output. The analog audio signal is then output via the audio output port 123.

Meanwhile, the video ES is decoded by the video decoder 124 to obtain baseband video data. The baseband video data is then subjected to processing, such as filter processing, by the output video processor 125. After having been processed by the output video processor 125, the video data is composited with data for display, such as text information from the controller 150, by means of the video compositing circuit 126. The composited video data is then converted into YC data, while also undergoing digital-to-analog conversion so as to generate an analog video signal for output. The analog video signal is then output via the video output port 127.

In this way, with the DVR in accordance with the present embodiment, video data and audio data for a target program is extracted from a selected channel of a digital broadcast signal received via the digital tuner 104. The extracted is then recorded to the hard disk of the HDD 130, while at the same time, an analog video signal and an analog audio signal are generated from the data and output. In other words, the target program provided as a digital broadcast signal can be viewed by the user while also being recorded to the hard disk of the HDD 130.

In addition, as described above, a new TS may be generated by the mux-demux circuit 111 and supplied to other devices via the digital I/F circuit 102 and the digital input/output port 101.

(3) Use of the Television Tuner and Radio Tuner

Operation will now be described for the case wherein analog signal input is received via the analog tuner 106 and then recorded to the hard disk of the HDD 130 or output as an analog signal. Types of analog tuners include tuners that receive and select channels from a terrestrial analog broadcast television signal, as well as tuners that receive and select channels from terrestrial amplitude modulation (AM) and frequency modulation (FM) broadcast radio signals. The analog tuner 106 provided in the DVR in accordance with the first embodiment will herein be described as a tuner that receives and selects channels from a terrestrial analog broadcast television signal.

More specifically, the analog tuner 106 in accordance with the first embodiment receives a terrestrial analog broadcast television signal, selects a channel therefrom, and then demodulates the selected signal channel to obtain an analog audio signal and an analog video signal. The analog tuner 106 then respectively supplies the analog audio signal to the audio processor 107 and the analog video signal to the video processor 109.

The audio processor 107 converts the supplied analog audio signal into a digital signal representing audio data, and then supplies this digital data to the audio encoder 108 and the output audio processor 122. The audio encoder 108 compresses the supplied audio data according to a predetermined compression format, such as one of the MPEG formats, and thereby generates an audio ES. The audio ES is then supplied to the mux-demux circuit 111.

Meanwhile, the video processor 109 subjects the supplied video signal to YC separation processing (i.e., luma-chroma separation, or separation into a luminance signal Y and a chrominance signal C). The separated signals subsequently undergo analog-to-digital conversion and are subjected to chroma decoding or other processing. Various other video signal processing, such as prefiltering, is also performed. The processed video data is then supplied to the video encoder 110 and the output video processor 125.

The video processor 109 is furthermore provided with functions for generating clock signals that provide synchronization signals and clock signals that provide the corresponding timings for each circuit block, as well as functions for providing such generated signals to respective circuit blocks. Such synchronization signals and clock signals are generated on the basis of a horizontal sync (HSync) signal, a vertical sync (VSync) signal, and a field sync signal obtained from the supplied video signal by sync separation.

The video encoder 110 compresses the video data supplied from the video processor 109 according to a predetermined compression format, such as one of the MPEG formats, and thereby generates a video ES. The video ES is then supplied to the mux-demux circuit 111.

When recording, the mux-demux circuit 111 multiplexes the audio ES supplied from the audio encoder 108 and the video ES supplied from the video encoder 110, together with various control signals. More specifically, when recording, the mux-demux circuit 111 performs multiplexing processing to combine an MPEG audio ES, an MPEG video ES, and various control signals that have been received as input, thereby generating an MPEG transport stream (TS), for example. The TS thus generated is then recorded to the hard disk of the HDD 130.

In addition, the audio data from the audio processor 107 is supplied to both the audio encoder 108 and the output audio processor 122, while the video data from the video processor 109 is supplied to both the video encoder 110 and the output video processor 125, as described above.

Furthermore, as described above, the audio data supplied to the output audio processor 122 undergoes digital-to-analog conversion so as to generate and output an analog audio signal for output, while the video data supplied to the output video processor 125 is similarly converted so as to generate an analog video signal for output, the analog video signal being output after passing through the video compositing circuit 126.

Thus, processing is conducted to convert an analog signal supplied via the analog tuner 106 to a digital signal, which is then recorded to the hard disk of the HDD 130, while other processing is conducted in parallel such that the audio data and video data to be recorded is also output for playback.

It is also of course possible to convert a signal acquired via the analog tuner 106 into a digital signal, and subsequently cause the converted digital signal to be output via the digital I/F circuit 102 and the digital input/output port 101.

Playback from the Hard Disk

Operation of the DVR 100 in accordance with the present embodiment will now be described for the case wherein video data and audio data that has been recorded to the hard disk of the HDD 130 as described above is played back. First, a target TS for playback is retrieved from the hard disk of the HDD 130 as a result of a control by the controller 150. The retrieved TS is then supplied to the mux-demux circuit ill.

During playback, the mux-demux circuit 111 demultiplexes the TS retrieved from the hard disk of the HDD 130 to yield a video ES and an audio ES. The audio ES thus obtained is then supplied to the audio decoder 121, while the video ES is supplied to the video decoder 124.

The subsequent processing by the audio decoder 121 and the video decoder 124 is the same as that described for the case wherein a signal supplied from the digital tuner 104 is recorded, for example. More specifically, the audio decoder 121 decodes the supplied audio ES to generate baseband audio data, such data being supplied to the output audio processor 122. The baseband audio data is then subjected to processing, such as filter processing, by the output audio processor 122, while also undergoing digital-to-analog conversion so as to generate an analog audio signal for output. The analog audio signal is then output via the audio output port 123.

Meanwhile, the video ES is decoded by the video decoder 124 to obtain baseband video data. The baseband video data is then subjected to processing, such as filter processing, by the output video processor 125. After having been processed by the output video processor 125, the video data is composited with data for display, such as text information from the controller 150, by means of the video compositing circuit 126. The composited video data is then converted into YC data, while also undergoing digital-to-analog conversion so as to generate an analog video signal for output. The analog video signal is then output via the video output port 127.

In so doing, video and audio corresponding to video data and audio data retrieved from the hard disk of the HDD 130 is output via one or more speakers and a television monitor respectively connected to the audio output port 123 and the video output port 127, or alternatively, via the television monitor 200 provided with one or more speakers and similarly connected. As a result, the video and audio is made available for viewing by the user.

The video data and audio data retrieved from the hard disk of the HDD 130 may also be output via the digital I/F circuit 102 and the digital input/output port 101.

Use of the Network Port and the Network Interface

As described in the foregoing, the DVR 100 in accordance with the present embodiment is provided with a network I/F circuit 141 and a network port 142, by means of which the DVR 100 is able to connect to a WAN 500 such as the Internet using a telephone line, for example, and thereby receive and transmit various data via the WAN 500.

The various communicable data described above includes not only video data and audio data, but may also include various programs and text data. In the case of video data and audio data, received data may be recorded to the hard disk of the HDD 130 after passing through the mux-demux circuit 111.

In addition, video data and audio data acquired via the WAN 500 may also be played back by means of the audio signal playback subsystem (made up of the 1mux-demux circuit 111, the audio decoder 121, the output audio processor 122, and the audio output port 123) and the video signal playback subsystem (made up of the mux-demux circuit 111, the video decoder 124, the output video processor 125, the video compositing circuit 126, and the video output port 127).

In addition, video data and audio data acquired via the network I/F circuit 141 and the network port 142 may also be output via the digital I/F circuit 102 and the digital input/output port 101.

Furthermore, programs and control data for use by the DVR 100 in accordance with the present embodiment may be provided and received via a network, saved to the EEPROM 154 or other memory, and then used as appropriate.

For example, programs and control data may be received via the network, whereby the functionality of the DVR 100 in accordance with the present embodiment is enhanced, or whereby EPG or other data is obtained and an electronic program guide is created in advance.

In addition, as described with reference to FIG. 1, the network I/F circuit 141 and the network port 142 may also be used to communicate with a mobile phone 300 connected to the DVR 100 in accordance with the present embodiment via the WAN 500.

Furthermore, in the present embodiment, an audio encoder and a video encoder respectively compress audio data and video data according to one of the MPEG formats, for example, while the audio decoder 121 and the video decoder 124 respectively decode (i.e., decompress) an audio ES and a video ES compressed using MPEG.

However, while the data compression technique used by the DVR 100 in accordance with the present embodiment is described herein as being one of the MPEG techniques, other compression techniques may also be used. Moreover, it is of course also possible to configure the DVR 100 to process uncompressed data without performing data compression.

Other Processing

As described in the foregoing and illustrated in FIG. 2, the DVR 100 in accordance with the present embodiment is provided with a list generator 161. In response to a request from the mobile phone 300, the list generator 161 generates a list of transfer content currently stored in the hard disk of the HDD 130. The generated list is then output from the list generator 161 via the network I/F circuit 141 and the network port 142 and subsequently transmitted to the mobile phone 300 via the WAN 500.

In addition, the DVR 100 in accordance with the present embodiment is provided with a converter 143, as illustrated in FIG. 2. The converter 143 will be described later in further detail, but in general terms, when a user is using digital content via the DVR 100 in accordance with the present embodiment and desires to transfer the digital content for use with the mobile phone 300, the converter 143 converts the digital content into transfer content to be transferred to the mobile phone 300.

More specifically, in the case where the digital content includes video data, the converter 143 may conduct processing so as to adjust the video size of the video data to a size suitable for display on the display element of the mobile phone 300, or to change the data compression scheme used to compress the digital content to a data compression scheme that is used by the mobile phone 300.

The DVR 100 in accordance with the present embodiment is also provided with dictionary data memory 162. As described earlier, the dictionary data memory 162 contains data from various dictionaries, such as dictionaries of places and proper names, and may be used when attaching tag information to digital content recorded to the hard disk of the HDD 130, for example.

Furthermore, a clock circuit 163 is also provided, as described earlier. The clock circuit 163 includes calendar functions and provides the current date as well as the current time. The clock circuit 163 also operates in conjunction with the controller 150 to realize functions enabling a target broadcast program to be scheduled for recording.

More specifically, the operation panel 164 or the remote control 170 is first used to input scheduled recording information for a target broadcast program (such information including the air date and time, channel, etc.) by means of EPG data, for example. Upon receiving such input, the controller 150 begins to monitor the current time provided by the clock circuit 163. When the current time reaches the recording start time specified in the scheduled recording information, the controller 150 controls the various components of the DVR 100 such that the scheduled broadcast program is recorded to the hard disk of the HDD 130.

The DVR 100 in accordance with the present embodiment is provided with an operation panel 164, the operation panel 164 being provided with buttons for various operations, such as a power on/off button, channel selection buttons, a record button, a stop button, a play button, a fast forward button, a rewind button, and a pause button.

Figure 3:
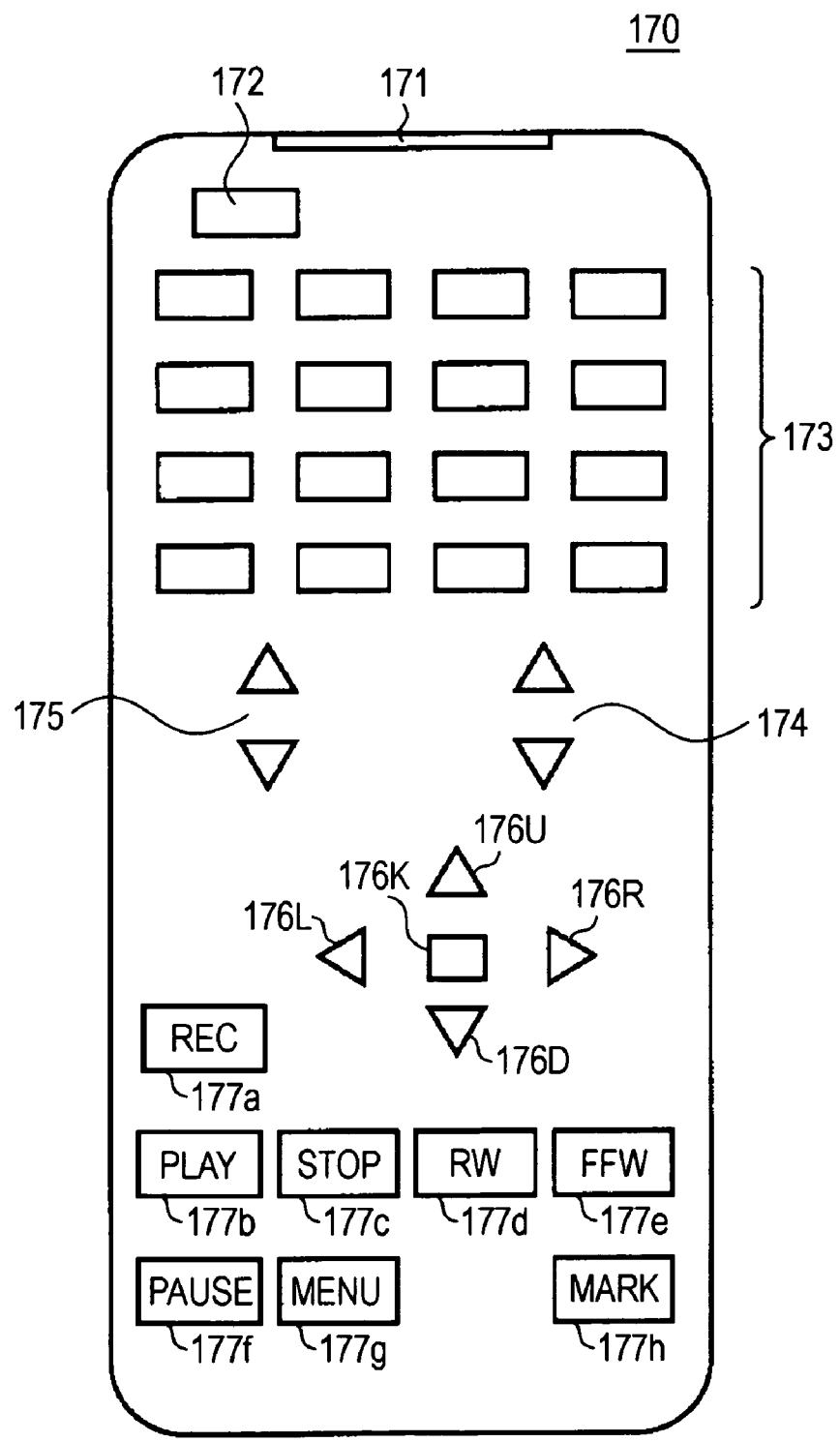
FIG. 3 is a diagram showing an example of the external appearance of a remote control 170 for the DVR 100 shown in FIGS. 1 and 2.

Additionally, the DVR 100 in accordance with the present embodiment is also provided with a remote control 170. The remote control 170 is a comparatively compact unit through which the user is able to use all of the functions provided in the DVR 100 in accordance with the present embodiment. FIG. 3 is a diagram for explaining an exemplary external appearance of the remote control 170 of the DVR 100 in accordance with the present embodiment.

As shown in FIG. 3, a remote control signal emitter (remote control signal transmitter) 171 is provided at the edge of the remote control 170. Additionally, provided on the operational face of the remote control 170 are a power on/off button 172, a numeric keypad 173, channel up/down buttons 174, volume up/down buttons 175, and a cursor navigation button group 176 that includes an up button 176U, a down button 176D, a right button 176R, a left button 176L, and a confirm (OK) button 176K.

An operational button group is also provided, the button group including a record button 177A, a play button 177B, a stop button 177C, a rewind button 177D, a fast forward button 177E, a pause button 177F, a menu button 177G, and a mark for transfer button 177H. The buttons from the record button 177A to the menu button 177G are identical to those provided in various DVRs and other devices of the related art.

More specifically, pressing the record button 177A causes the DVR 100 to start recording the digital content currently being provided to the hard disk of the HDD 130. Pressing the play button 177B issues a command to the DVR 100 to select and play back target digital content from among the digital content that has been recorded to the hard disk of the HDD 130.

Pressing the stop button 177C causes the DVR 100 so stop (i.e., abort) the processing currently being executed, such as the processing for recording, playing back, rewinding, or fast forwarding content, for example. Pressing the rewind button 177D causes the DVR 100 to begin rewinding the selected digital content, while pressing the fast forward button 177E causes the DVR 100 to begin fast forwarding the selected digital content.

Pressing the pause button 177F causes the DVR 100 to temporarily suspend the processing currently being executed, such as the processing for recording, playing back, rewinding, or fast forwarding content, for example. Pressing the pause button 177F a second time issues a command to cancel the suspend operation, and thus causes the DVR 100 to resume the processing that had been suspended.

Pressing the menu button 177G causes the DVR 100 in accordance with the present embodiment to display a menu of selectable items that represent various executable processes, thereby allowing the user to select a target process. For example, the user may cause processing to be executed for adjusting the time of the clock circuit 163, configuring broadcast channels, or configuring various other settings by selecting a target process from among the menu items displayed as a result of the user pressing the menu button 177G. The selection and confirmation of menu items is conducted by operating the respective buttons that constitute the cursor navigation button group 176.

Meanwhile, the mark for transfer button 177H is not provided in DVRs of the related art and is unique to the DVR 100 in accordance with the present embodiment. When the user is viewing video and audio corresponding to digital content output via the DVR 100 by means of the television monitor 200, and furthermore wherein the user desires the content for use on the mobile phone 300 as described earlier, the user issues a command to transfer the digital content for use with the mobile phone 300 by operating the mark for transfer button 177H provided on the remote control 170.

When the mark for transfer button 177H is pressed, the controller 150 of the DVR 100 first controls the mux-demux circuit 111 and the converter 143 such that a video ES and an audio ES for playback are generated from the digital content and supplied from the mux-demux circuit 111 to the converter 143.

The controller 150 then controls the converter 143 so as to convert the supplied video ES and audio ES into data in a format suitable for the mobile phone 300, thereby generating transfer content to be transferred to the mobile phone 300. More specifically, transfer content is generated by adjusting the video size and changing the data compression format so as to match the capability of the mobile phone 300, as described earlier.

The transfer content generated by the converter 143 in this way is subsequently multiplexed by the mux-demux circuit 111 and recorded to the HDD 130 as transfer content. In this case, the mux-demux circuit 111 appends metadata to transfer content according to a control from the controller 150.

The processing to generate and record the transfer content to the hard disk of the HDD 130 may also be easily terminated by pressing the mark for transfer button 177H a second time.

In addition, once the user has pressed the mark for transfer button 177H and the processing to generate and record the transfer content has commenced, the DVR 100 may be configured to analyze the video data and/or the audio data of the digital content such that the processing to generate and record the transfer content is terminated when a scene change is detected.

In addition, once the user has pressed the mark for transfer button 177H and the processing to generate and record the transfer content has commenced, the DVR 100 may be configured to analyze the video data of the digital content such that the processing to generate and record the transfer content is terminated when credits signifying the end of a program (i.e., textual information on the performers appearing in the program, etc.) are detected as being displayed.

In this way, by analyzing the video data and/or audio data of the digital content to be recorded, the processing to generate and record the transfer content may be automatically terminated when the end of a scene or the end of a program is detected.

In addition, once the user has pressed the mark for transfer button 177H and the processing to generate and record the transfer content has commenced, the DVR 100 may be configured to automatically terminate the processing to generate and record the transfer content after a fixed amount of time determined in advance has elapsed, or alternatively, after an amount of time set by the user has elapsed.

Transfer Content

FIG. 4 is a diagram for explaining a specific example of transfer content generated and recorded in the DVR 100 in accordance with the present embodiment as a result of the user pressing the mark for transfer button 177H, the transfer content being first generated by the mux-demux circuit 111 and the converter 143 working in conjunction, and then recorded to the hard disk of the HDD 130.

As shown in FIG. 4, the transfer content may be largely divided into a metadata portion and a content data portion. The metadata portion includes a variety of information, such as the filename, acquisition date, provider information, program title, information on performers or other persons appearing in the program, detailed program information, user-defined tags, representative image data (i.e., thumbnail data), transfer mark information, as well as the record start and stop times.

Herein, the filename is a name applied to the file containing the transfer content. The acquisition date is information indicating the date and time when the transfer content was acquired by the DVR. For example, the acquisition date may be information acquired from the clock circuit 163 of the DVR 100 at the time the mark for transfer button 177H was pressed.

The provider information is information indicating the source that provided the digital content. More specifically, in the case where the digital content is provided via broadcast media, the provider information may indicate the broadcasting station (i.e., the broadcasting company) that provided the digital content. The provider information may be acquired from other information such as an electronic program guide (EPG) that was provided in advance and saved. Furthermore, in the case where the digital content is provided by a server over a WAN, the provider information may indicate the uniform resource locator (URL) of the providing server. Furthermore, in the case where the digital content is provided by an external device connected to the DVR 100 via the digital input/output port 101 and the digital I/F circuit 102, the provider information may include an original equipment manufacturer (OEM) identifier or similar information for the external device that is recognized by the digital I/F circuit 102.

The program title, performer information, and detailed program information is information appended to the digital content. In the case where the digital content is provided via broadcast media, the above information may be acquired from other information such as an EPG that has been provided in advance and saved. Furthermore, in the case where the digital content is provided by a server over a WAN, the above information may be received from the server providing the content. Furthermore, in the case where the digital content is provided by an external device connected to the DVR 100 via the digital input/output port 101 and the digital I/F circuit 102, the above information may be received from the external device providing the content.

The user-defined tags constitute various information input by the user via the operation panel 164 or the remote control 170. For example, the user is able to append arbitrary information to digital content, such as "delete after viewing" or "save permanently". The representative image data is data, such as an image from the program taken at the record start time, that enables the user to check and confirm what the digital content contains. The representative image data may also be used as index information, for example.

The transfer mark information, shown being below the representative image data field in FIG. 4, is information indicating that the current content is not regular recorded digital content, but rather transfer content that has been saved for the purpose of being transferred to the mobile phone 300. The transfer mark information is appended to the content that is generated as a result of the user pressing the mark for transfer button 177H as described above.

When the user presses the record button 177A, digital content is recorded to the hard disk of the HDD 130, and metadata may also be applied to the recorded digital content. However, in this case, the metadata does not include the transfer mark information. More specifically, either the transfer mark information field itself is not provided in this case, or the transfer mark information field is provided as a null field having a value of zero, for example.

The record start time is the time when the DVR 100 started recording the transfer content, while the record stop time is the time when the DVR 100 stopped recording the transfer content. Both of these times are acquired from the clock circuit 163 as a result of the controller 150 sensing the operational state of the DVR 100.

The content data portion contains the digital content (i.e., content to be transferred) that was generated as a result of the converter 143 converting the original digital content and the mux-demux circuit 111 subsequently multiplexing the converted content, as described above.

In this way, the transfer content is made up of both digital content that has been converted for use with the mobile phone 300 (i.e., content to be transferred), as well as metadata containing information indicating that the content is for transfer (i.e., transfer mark information). Thus, the DVR 100 is able to easily extract transfer content on the basis of the transfer mark information included in the metadata.

Consequently, as described above, the DVR 100 in accordance with the present embodiment is able to generate and store transfer content in response to commands from the user, generate a list of transfer content in response to a request from the mobile phone 300, and subsequently provide the requested transfer content to the mobile phone 300.

Exemplary Configuration of the Mobile Phone 300

Figure 5:
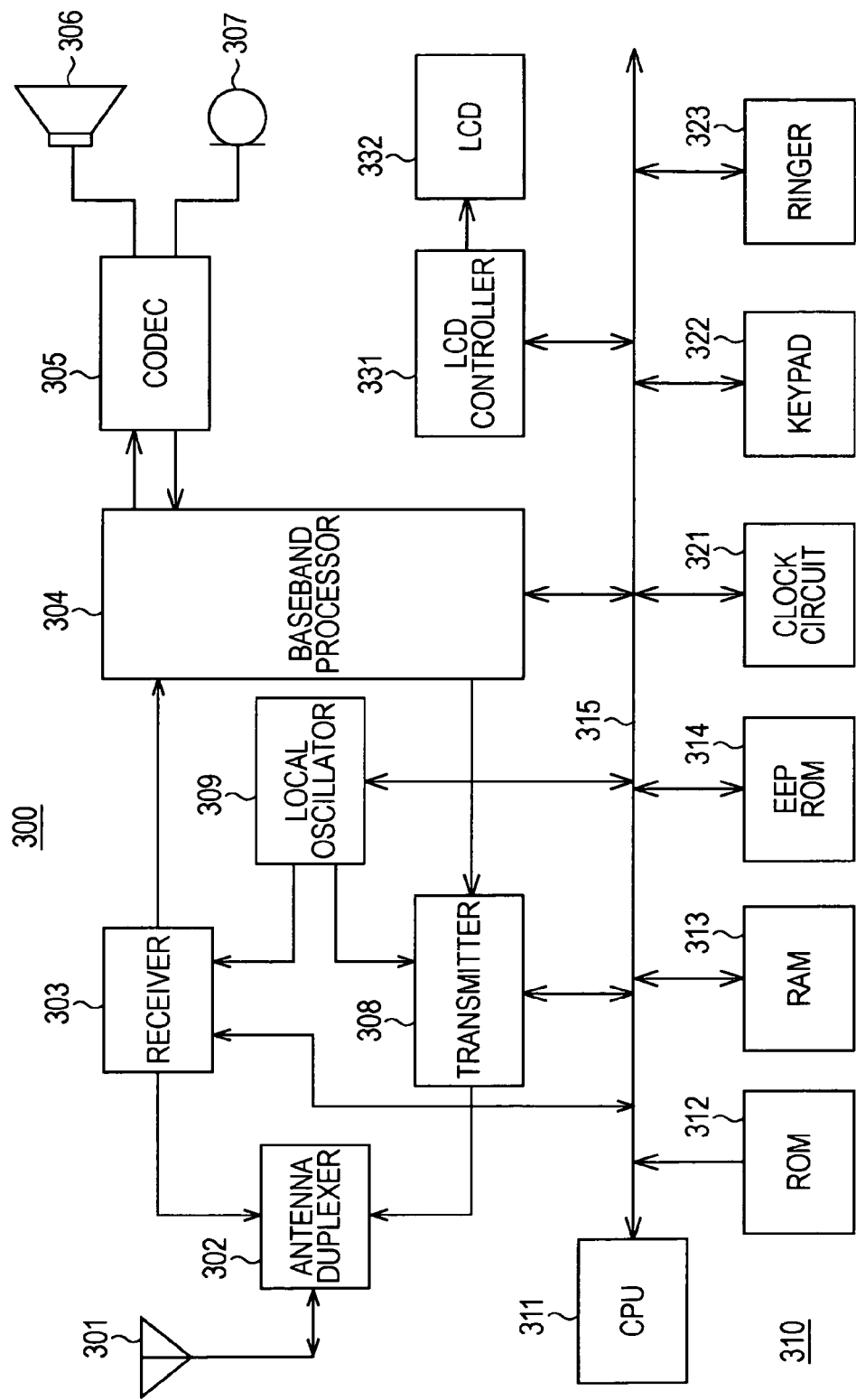
FIG. 5 is a block diagram showing an exemplary configuration of the mobile phone 300 illustrated in FIG. 1.

An exemplary configuration of the mobile phone 300 illustrated in FIG. 1 will now be described. FIG. 5 is a block diagram for explaining an exemplary configuration of a mobile phone 300 in accordance with the present embodiment. As shown in FIG. 5, the mobile phone 300 in accordance with the present embodiment is provided with a transmitting and receiving antenna 301, an antenna duplexer 302, a receiver 303, a baseband processor 304, a codec 305, a receiving earpiece (speaker) 306, a transmitting mouthpiece (microphone) 307, a transmitter 308, a local oscillator 309, a controller 310, a clock circuit 321, a keypad 322, a ringer 323, a liquid crystal display (LCD) controller 331, and an LCD 332. Additionally, although not shown in the drawings for the sake of simplicity in the description herein, the mobile phone 300 is also provided with a vibrator that notifies the user of incoming calls or similar events, as well as an external I/F unit for connecting the mobile phone 300 to external devices.

First, the controller 310 will be described, along with the clock circuit 321, the keypad 322, the ringer 323, the LCD controller 331, and the LCD 332 connected thereto. The controller 310 controls the respective components of the mobile phone 300 in accordance with the present embodiment. The controller 310 is a microprocessor having a CPU 311, ROM 312, RAM 313, and EEPROM 314 connected via a CPU bus 315.

The CPU 311 herein is the principal means of control, operating so as to execute programs saved in the ROM 312 or similar memory to be hereinafter described, and thereby generating control signals supplied to the various components. The CPU 311 also receives and processes signals from the various components. As described above, the ROM 312 stores a variety of data for processing, such as font data or various programs that are executed by the CPU 311.

The RAM 313 is primarily used as a work area, and temporarily stores the interim results of various processing, for example. The EEPROM 314 is non-volatile memory and is used to save information that should be retained even if power is cut to the mobile phone 300. For example, the EEPROM 154 may save various configuration parameters, address book data, email data, and newly-provided programs.

As shown in FIG. 5, the controller 310 is also connected to a clock circuit 321. The clock circuit 321 is provided with calendar functions, and is able to provide the current date, weekday, and time. Additionally, the controller 310 is also connected to a keypad 322. Although not shown in the drawings, the keypad 322 is provided with a plurality of operation buttons, such as numeric buttons and function buttons, as well as a jog dial capable of being both rotated and depressed, for example. By means of these buttons, the keypad 322 receives input operations from the user.

When an input operation from the user is received via the keypad 322, the input is converted into an electrical signal and supplied to the controller 310. In so doing, the controller 310 controls various components in response to the user's commands and is able to conduct processing in response to the user's commands.

The controller 310 is also connected to a ringer 323 as well as an LCD 332 via an LCD controller 331. The ringer 323 includes a ringer controller, and is able to emit warning sounds or ringtones according to control signals from the controller 310. In addition, the LCD 332 is able to display various display information on a display screen according to control by the LCD controller 331 (being controlled in turn by the controller 310).

More specifically, the LCD 332 can be made to display, on a display screen, various information such as error messages, guidance messages, incoming call notifications, address book information, email information, and as described hereinafter, various information received from a DVR 100 installed in the user's home.

The receiving subsystem of the mobile phone 300 in accordance with the present embodiment will now be described. First, an incoming signal received via the transmitting and receiving antenna 301 is supplied to the receiver 303 via the antenna duplexer 302. The receiver 303 then conducts processing for bandlimiting and automatic gain control (AGC) to adjust the incoming signal to a suitable level. In addition, on the basis of a signal supplied from the local oscillator (i.e., a frequency synthesizer) 309, the receiver 303 conducts processing to change the frequency of the incoming signal to a fixed frequency. The processed signal is then supplied to the baseband processor 304.

The baseband processor 304 performs analog-to-digital (A/D) conversion on the signal supplied from the receiver 303, removes phasing or other effects, determines the signal type of the incoming signal, deinterleaves the signal, performs error correction processing, and performs processing to appropriately decode the signal, thereby demultiplexing the signal into audio data and other communications data. The audio data is supplied to a codec 305 configured to operate as a digital signal processor (DSP), while the other communications data (which may include various control information, text data, and video data, for example) is supplied to the controller 310.

The codec 305 performs digital-to-analog (D/A) conversion on the audio data supplied from the baseband processor 304, thereby generating an analog audio signal. The generated audio signal is then supplied to the speaker 306. The analog audio signal supplied from the codec 305 drives the speaker 306, thus causing the speaker 306 to emit sound corresponding to the incoming signal.

Meanwhile, the communications data supplied to the controller 310 from the baseband processor 304 is, for example, temporarily saved in the RAM 313 of the controller 310 and subsequently used by the mobile phone in the case where the communications data is control data for use with the mobile phone 300 in accordance with the present embodiment. Alternatively, the communications data is decoded by the controller 310 and subsequently supplied to the LCD controller 331 in the case where the communications data is text data or video data, for example.

The LCD controller 331 generates a video signal for display from supplied data for display, and then supplies the generated video signal to the LCD 332. In so doing, a list of transfer content or video corresponding to transfer content provided by a DVR 100 installed in the user's home, for example, can be displayed on the display screen of the LCD 332.

Audio data that is included in transfer content is first decoded by the controller 310, passed through a digital-to-analog converter (DAC) and an amplifying circuit (amp) not shown in the drawings, and subsequently supplied to a speaker or audio output port not shown in the drawings. As a result, the audio is made available for use by the user.

The transmission subsystem of the mobile phone 300 in accordance with the present embodiment will now be described. First, the microphone 307 converts collected sound into an analog audio signal, and then supplies the analog signal to the codec 305. The codec 305 performs A/D conversion on the analog audio signal supplied from the microphone 307, thereby generating a digital audio signal. The digital signal is then supplied to the baseband processor 304.

The baseband processor 304 codes and compresses the digital audio signal supplied from the codec 305 into a predetermined format, thereby collecting the signal into predefined blocks. The baseband processor 304 may also collect other data into the predefined blocks, such as digital data for transfer that has been received via the keypad 322 and supplied via the controller 310. The baseband processor 304 thus collects the compressed digital audio signal and such data for transfer received via the keypad 322, and supplies the resulting digital data to the transmitter 308.

The transmitter 308 then generates a modulated signal from the digital data supplied from the baseband processor 304. Subsequently, in order to convert the frequency modulated signal to a predetermined transmission frequency, the transmitter 308 mixes the modulated signal with a conversion signal supplied from the local oscillator 309, thereby generating a modulated signal for transmission. The modulated signal for transmission thus generated by the transmitter 308 is then transmitted from the transmitting and receiving antenna 301 after passing through the antenna duplexer 302.

When the mobile phone 300 having the receiving and transmission subsystems as described above in accordance with the present embodiment is waiting to receive a signal (i.e., when in standby), the controller 310 monitors the baseband processor 304 for incoming signals in order to thereby detect an incoming call to the device. When the controller 310 detects an incoming call to the device, the controller 310 controls the ringer 323 so as to emit a ringtone and/or cause the vibrator (not shown in the drawings) to vibrate. In so doing, the user of the mobile phone 300 is notified of the incoming call to the device.

The user may then perform an operation to answer the incoming call, such as pressing a call button provided on the keypad 322 of the mobile phone 300 in accordance with present embodiment. In this case, the controller 310 sends a connection acknowledgement or other information via the transmission subsystem to establish the call, thereby enabling communication by means of receiving and transmission subsystems as described above.

In addition, the user may also perform an operation to initiate a call from the mobile phone 300 in accordance with the present embodiment, such as pressing a call button provided on the keypad 322. In this case, the user subsequently enters a telephone number using the numeric buttons on the keypad 322, or alternatively, by selecting a recipient's telephone number from among address book data that has been input in advance.

As a result of the above, the controller 310 generates a call request and then transmits the call request via the transmission subsystem, thereby attempting to establish a call with the telephone of the receiving party. If a call acknowledgement from the receiving party is subsequently received and the establishment of the call is confirmed, communication becomes possible by means of the receiving and transmission subsystems as described above.

In addition, the mobile phone 300 in accordance with the present embodiment is also able to connect to the Internet. For example, information from a Web page may be acquired by inputting a transmitting a uniform resource locator (URL) via an Internet service function provided by the telephone company. This information may be subsequently displayed on the LCD 332 via the controller 310.

In addition, the mobile phone 300 in accordance with the present embodiment is also configured such that the user may input information via the keypad 322 and the LCD 332 to thereby create outgoing email data stored in the EEPROM 314. The outgoing email data is then transmitted to the mail server of the target party via the Internet. Additionally, email addressed to the mobile phone 300 may be received from a mail server and stored in the EEPROM 314, and subsequently displayed on the LCD 332.

In this way, the mobile phone 300 in accordance with the present embodiment is able to conduct telephony and data communications via a WAN 500 such as a mobile phone network or the Internet.

Furthermore, as described above, the mobile phone 300 in accordance with the present embodiment may also access a DVR 100 installed in the user's home via the WAN 500 and request a list of transfer content. The mobile phone 300 may then receive transfer content selected from the list, thereby making the received content available on the mobile phone 300 for playback and viewing by the user.

Using Transfer Content

Figure 6:
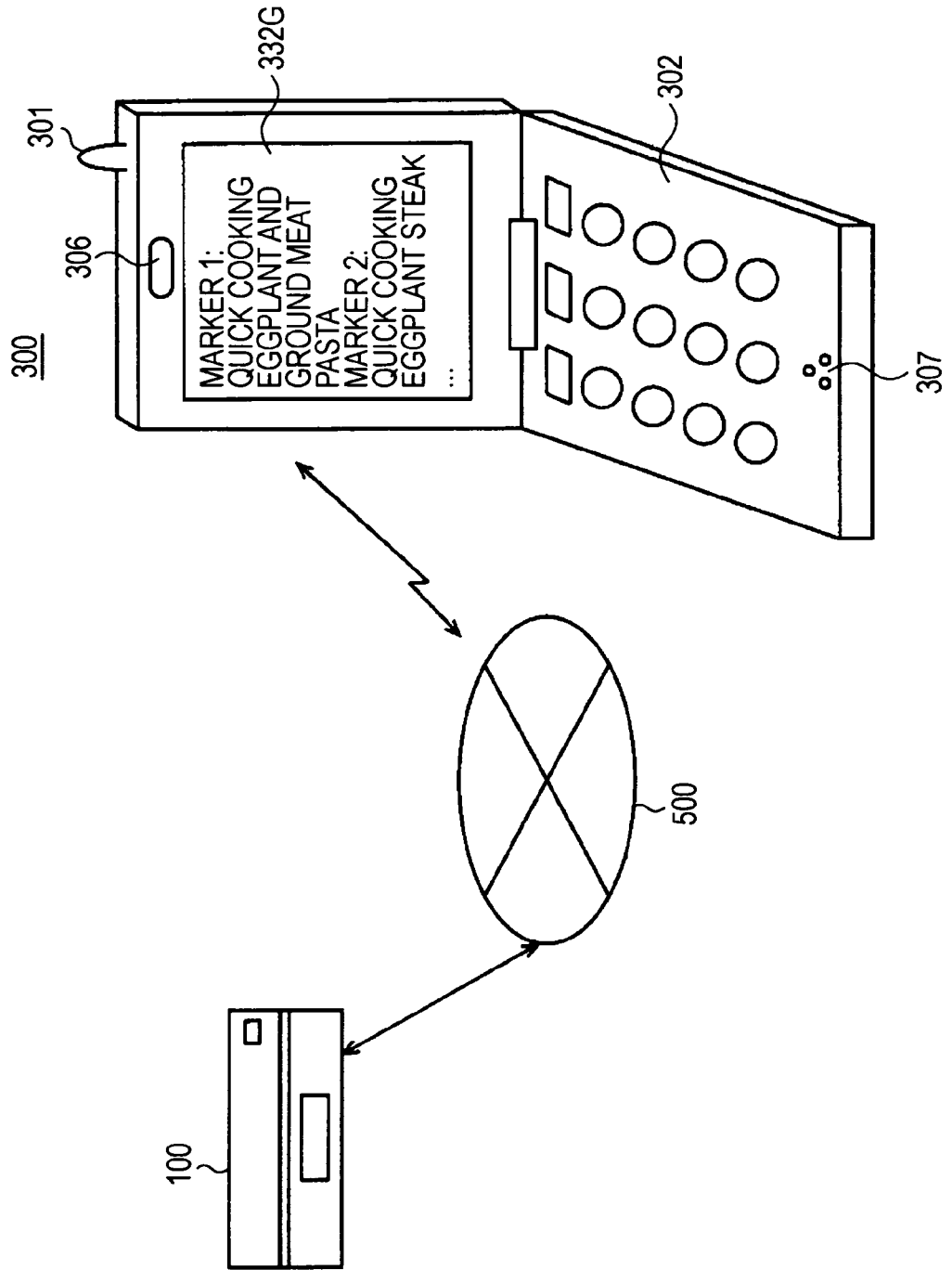
FIG. 6 is a diagram for explaining how a list of transfer content is used with the mobile phone 300.
Figure 7:
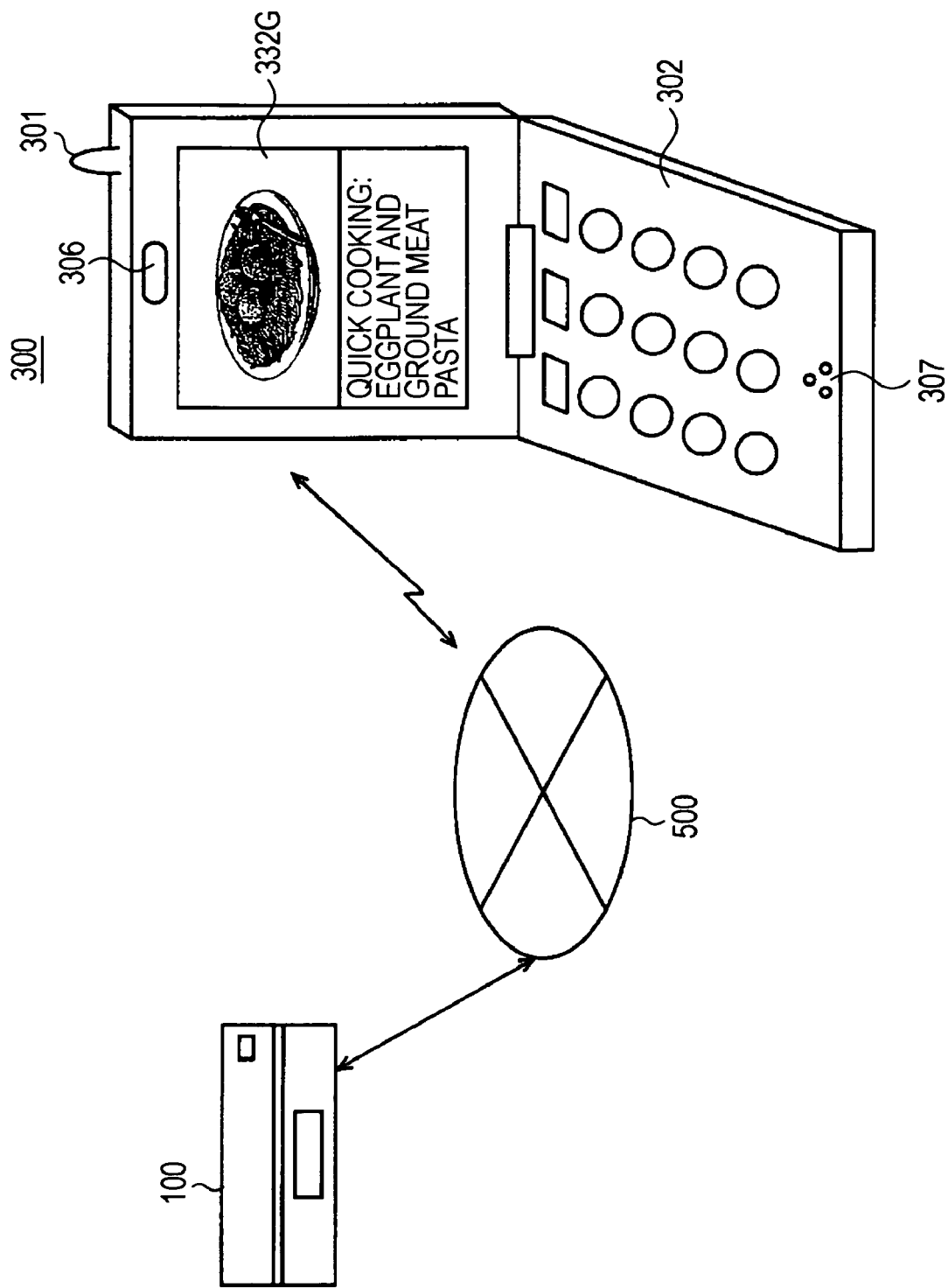
FIG. 7 is a diagram for explaining how transfer content is used with the mobile phone 300.

A specific example of transfer content usage conducted by means of the mobile phone 300 will now be described with reference to FIGS. 6 and 7. FIG. 6 is a diagram for explaining how the list of transfer content is used with the mobile phone 300. FIG. 7 is a diagram for explaining how transfer content is used with the mobile phone 300.

As shown in FIG. 6, the mobile phone 300 in accordance with the present embodiment accesses a DVR 100 installed in the user's home via the WAN 500 and transmits a request for a list of transfer content. Subsequently, a list of transfer content is transmitted from the DVR 100. The mobile phone 300 then receives and displays the list on the display screen of the LCD 332.

In the example shown in FIG. 6, a list of transfer content is displayed on the display screen 332G of the LCD 332 of the mobile phone 300. The list includes entries such as "Marker 1: Quick Cooking, Eggplant and Ground Meat Pasta" and "Marker 2: Quick Cooking, Eggplant Steak".

In this case, "Marker 1" and "Marker 2", correspond to sequential numbers used to list the transfer content. In other words, "Marker 1" refers to the first set of transfer content, and "Marker 2" refers to the second set of transfer content. "Quick Cooking" is the program name in this case. "Eggplant and Ground Meat Pasta" and "Eggplant Steak" describe the content of the program.

The user is thus able to select a desired set of transfer content for viewing with the mobile phone 300 from among the list of transfer content provided as described above. More specifically, the user selects target transfer content by operating directional buttons provided on the mobile phone 300 so as to position a cursor over the display field of the target transfer content, and then performing a predetermined operation to confirm the selection. Alternatively, the user may input the sequential number corresponding to the target transfer content (inputting "1" to select the list item corresponding to "Marker 1", for example) and then perform a determined operation to confirm the selection. In so doing, the user of the mobile phone 300 causes the mobile phone 300 to transmit a request for the target transfer content to the DVR 100.

Subsequently, the transfer content requested by the mobile phone 300 is transmitted from the DVR 100. The mobile phone 300 receives this content, and makes the content available for playback as described above.

For example, the mobile phone 300 may transmit a request to the DVR 100 to provide the "Marker 1: Quick Cooking, Eggplant and Ground Meat Pasta" content, the content having been selected by the user from among the list of transfer content illustrated in FIG. 6. In this case, the transfer content is transmitted from the DVR 100 and subsequently received and processed for playback by the mobile phone 300. As a result, video (i.e., moving images) corresponding to the video data contained in the transfer content is displayed on the display screen 332G of the LCD 332 provided in the mobile phone 300, while sound corresponding to the audio data contained in the transfer content is also emitted from the one or more speakers provided in the mobile phone 300.

In this way, in the content usage system in accordance with the present embodiment, transfer content stored in a DVR 100 is provided to and received by a mobile phone 300, and subsequently made available for playback and viewing by the user by means of the mobile phone 300. Furthermore, of principal importance herein is the fact that the DVR 100 only provides the mobile phone 300 with transfer content that can be stored in the mobile phone 300.

Figure 8:
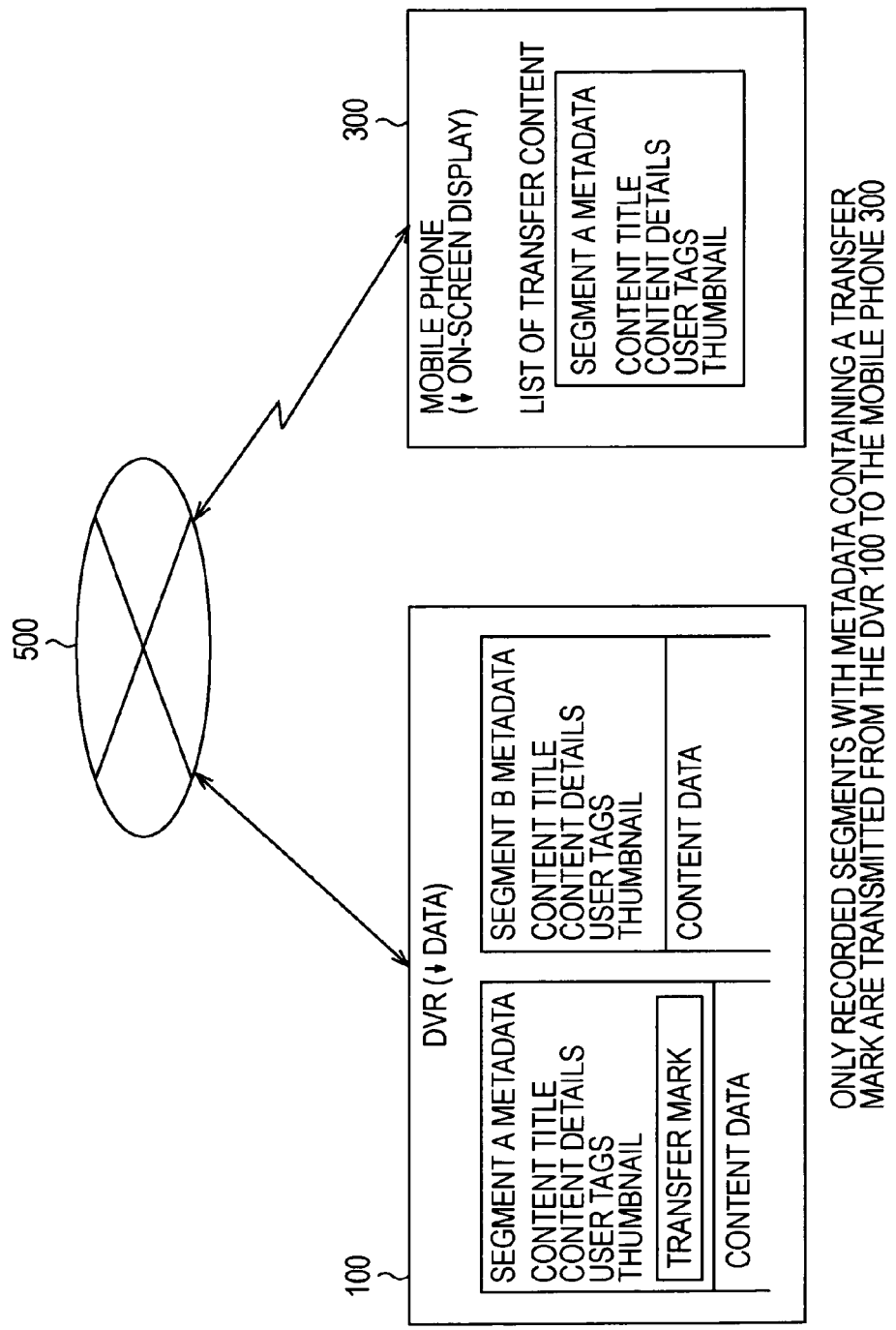
FIG. 8 is a diagram for explaining content data provided to the mobile phone 300 from the DVR 100.

FIG. 8 is a diagram for explaining the transfer content stored in the DVR 100, as well as the digital content provided to the mobile phone 300 by the DVR 100.

As shown in FIG. 8, the DVR 100 stores transfer content (Segment A) having transfer mark information appended thereto, as well as regular digital content (Segment B) that does not have transfer mark information appended thereto. Herein, Segment A and Segment B refer to units, based on program scenes, whereby content is recorded.

More specifically, while the underlying assumption of normal recording is that recording is conducted on the basis of individual programs, in the present embodiment such recording is not limited to recording on a per-program basis. Rather, it is assumed herein that individual segments (i.e., portions) of a program are recorded, such as a plurality of mini-features that combine to form a single broadcast program.

In the example shown in FIG. 8, the only transfer content stored in the DVR 100 is Segment A. For this reason, the list of transfer content provided to the mobile phone 300 via the WAN 500 only contains an entry for Segment A. Consequently, the only digital content that the mobile phone 300 is able to receive is the content corresponding to Segment A.

In other words, the DVR 100 is able to quickly provide to the mobile phone 300 only the transfer content stored therein for transfer, while digital content that has been recorded normally is excluded from transfer. Consequently, the user is able to quickly and reliably transfer to the mobile phone 300 just the content that has been stored as transfer content as a result of the user's decision.

Overview of the Operation of the Content Usage System

The operation of the content usage system in accordance with the present embodiment will now be described with reference to the flowcharts shown in FIGS. 9 and 10.

First, the processing for recording transfer content in the DVR 100 (i.e., the processing conducted when digital content is marked for transfer) will be described. FIG. 9 is a flowchart for explaining the processing conducted in the DVR 100 in accordance with the present embodiment in the case where the mark for transfer button is pressed.

Figure 9:
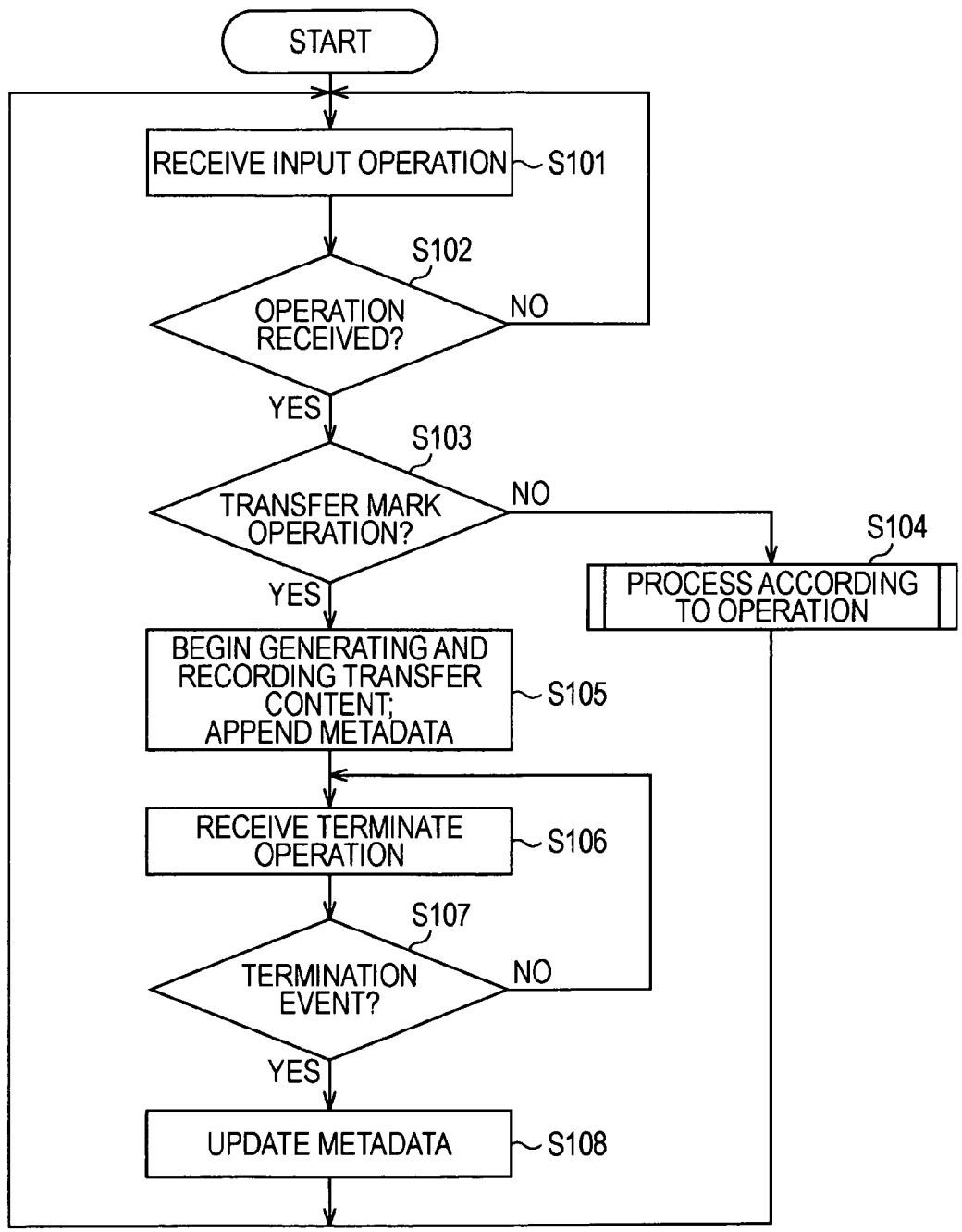
FIG. 9 is a flowchart for explaining the processing conducted when a mark for transfer button of the DVR 100 is pressed.

The processing shown in FIG. 9 is executed by the controller 150 of the DVR 100, such processing being executed when power is supplied to the DVR 100, and when digital content supplied to the DVR 100 is supplied to the television monitor 200 connected thereto, or alternatively, when digital content stored in the hard disk of the HDD 130 is supplied for playback to the television monitor 200 connected thereto.

When the processing shown in FIG. 9 is executed, the controller 150 first operates so as to be able to receive input operations from the user via the remote control 170 or the operation panel 164 (step S101), and then determines whether or not an input operation is received (step S102). If the controller 150 determines in step S102 that an input operation has not been received, the controller 150 repeats the processing starting from step S101 so as to be able to receive input operations from the user.

If the controller 150 determines in step S102 that an input operation from the user has been received, the controller 150 subsequently determines whether or not the received input operation corresponds to the user pressing the mark for transfer button 177H of the remote control 170 (step S103). If the controller 150 determines in step S103 that the received input operation does not correspond to the user pressing the mark for transfer button 177H, then other processing is executed according to the input operation (step S104), and subsequently, the process returns to repeat the processing starting from step S101.

If the controller 150 determines in step S103 that the received input operation does correspond to the user pressing the mark for transfer button 177H, then the controller 150 controls various components such as the mux-demux circuit 111, the converter 143, and the HDD 130 so as to commence the processing of step S105. In step S105, the controller 150 uses the functions of the converter 143 to convert the digital content currently being output by the DVR 100 into transfer content for transfer to the mobile phone 300. In addition, the controller 150 uses the functions of the mux-demux circuit 111 to append data to the converted content, thereby generating transfer content to be recorded. The generated transfer content is then recorded on the hard disk of the HDD 130.

In the processing of the above step S105, metadata containing transfer mark information is generated by means of the functions of the mux-demux circuit 111 as controlled by the controller 150, such metadata being appended to the transfer content. More specifically, as described with reference to FIG. 4, the digital content currently being output by the DVR 100 is modified to generated transfer content, and the generated transfer content is then recorded on the hard disk of the HDD 130.

Subsequently, the controller 150 operates so as to be able to receive a terminate operation (step S106). The terminate operation may correspond to the user pressing the mark for transfer button 177H a second time, for example. Subsequently, the controller 150 determines whether not a termination event has occurred, whereby the generation and recording of transfer content should be terminated (step S107). The termination event may be the receiving of a terminate operation as described above, or alternatively, the termination of digital content playback or supply to the DVR.

If the controller 150 determines in step S107 that a termination event has not occurred, then the processing starting from step S106 is repeated, and the generation and recording of transfer content is continued until such a termination event occurs.

If the controller 150 determines in step S107 that a termination event has occurred, then the controller 150 updates the metadata for the transfer content (step S108). For example, the controller 150 may update the recording stop time in the metadata. Subsequently, the processing starting from step S101 is repeated.

If the user conducts an operation to turn off the DVR 100 during the processing shown in FIG. 9, then predetermined termination processing is conducted, such as closing the files currently in use, and the processing shown in FIG. 9 ends.

In this way, when the mark for transfer button 177H of the DVR 100 in accordance with the present embodiment is pressed, the digital content currently in use is converted into transfer content and stored.

The foregoing description with reference to FIG. 9 describes a case wherein processing to generate and record transfer content is commenced when the mark for transfer button 177H is pressed, and terminated when the mark for transfer button 177H is pressed a second time. However, the present invention is not limited thereto.

As described earlier, the processing to generate and record transfer content may also be ended as a result of the controller 150 determining that a termination event has occurred. The termination event may be determined as a result of the controller 150 analyzing the video data and/or audio data of the digital content being recorded, and subsequently detecting the end of the digital content being recorded, or alternatively, detecting a scene change in the digital content being recorded.

Next, the processing for transmitting transfer content between the DVR 100 and the mobile phone 300 of the content usage system in accordance with the present embodiment will be described. FIG. 10 is a flowchart for explaining the processing for transmitting transfer content between the DVR 100 and the mobile phone 300. FIG. 10A shows processing conducted by the mobile phone 300, while FIG. 10B shows processing conducted by the DVR 100. The sending and receiving of data between the two devices is indicated by the dashed lines.

When transfer content is ready for provision after having generated and recorded transfer content to the hard disk of the HDD 130 in response to commands from the user as described with reference to FIG. 9, the DVR 100 subsequently executes the processing shown in FIG. 10, so as to receive a connection request from the mobile phone 300 that has been transmitted via the WAN 500.

Meanwhile, when the mobile phone 300 is to receive transfer content stored in the DVR 100, the mobile phone 300 executes the processing shown in FIG. 10A as a result of the user conducting an predefined input operation via the keypad 322. Subsequently, the controller 310 of the mobile phone 300 generates a connection request with respect to the DVR 100, and then transmits this connection request the DVR 100 by means of the baseband processor 304, the transmitter 308, the antenna duplexer 302, and the transmitting and receiving antenna 301 (step S201). In this case, a connection request is transmitted to the DVR 100 using either a telephone number or a URL assigned to the DVR 100.

As described above, the DVR 100 waits to receive a connection request transmitted from the mobile phone 300. When the DVR 100 receives a connection request from the mobile phone 300 by means of the network port 142 and the network I/F circuit 141 (step S301), the controller 150, using information such as a device ID included in the connection request, executes authentication processing to determine whether or not the connection request originates from a mobile phone 300 that is allowed to establish a connection for communication with the DVR 100 (step S302).

Subsequently, the controller 150 of the DVR 100 determines whether or not the connection request was authenticated by the authentication processing in step S302 (step S303). If the controller 150 determines in step S303 that the connection request was not authenticated, then the processing shown in FIG. 10B is terminated, and no information is provided to the mobile phone that transmitted the connection request (step S304). However, in step S304, the DVR 100 may reply to the mobile phone that transmitted the connection request with a message indicating that the DVR 100 has refused the connection request due to an authentication failure.

If the controller 150 of the DVR 100 determines in step S303 that the connection request was authenticated, then the controller 150 subsequently generates an acknowledgement message to be transmitted to the mobile phone 300. The acknowledgement message is then output via the network I/F circuit 141 and the network port 142, and subsequently transmitted to the mobile phone 300 (step S305).

The mobile phone 300 then receives the acknowledgement message transmitted from the DVR 100 in response to the connection request that was originally transmitted, the acknowledgement message being received by means of the transmitting and receiving antenna 301, the antenna duplexer 302, the receiver 303, and the baseband processor 304 (step S202). In step S202, by receiving the acknowledgement message transmitted in response to the connection request, the establishment of a connection with the DVR 100 is confirmed. Subsequently, the controller 310 of the mobile phone 300 generates a request for a list of transfer content, and then transmits this list request to the DVR 100 by means of the baseband processor 304, the transmitter 308, the antenna duplexer 302, and the transmitting and receiving antenna 301 (step S203).

The request for a list of transfer content transmitted from the mobile phone 300 as described above is then received by the DVR 100 via the network port 142 and the network I/F circuit 141 (step S306). Upon receiving the request for a list of transfer content, the list generator 161 of the DVR 100 refers to the metadata of the digital content stored in the hard disk of the HDD 130, and as described with reference to FIG. 4, extracts only the metadata containing transfer mark information. The list generator 161 then generates a list of transfer content from the extracted metadata. The generated list is then transmitted to the mobile phone 300 that originated the list request (step S307).

The mobile phone 300 subsequently receives the list of transfer content from the DVR 100 by means of the transmitting and receiving antenna 301, the antenna duplexer 302, the receiver 303, and the baseband processor 304 (step S204). The received list of transfer content is then supplied to the LCD 332 via the LCD controller 331, and as described with reference to FIG. 6, the list of transfer content is displayed on the display screen of the LCD 332 (step S205).

Subsequently, the controller 310 operates so as to receive, via the keypad 322, selection input that specifies transfer content to be received from among the list of transfer content displayed on the LCD 332 (step S206). In this case, when the list of transfer content contains information for a large amount of transfer content, the controller 310, the LCD controller 331, and the LCD 332 may be configured to scroll the display to enable the user to search for the target transfer content.

When selection input selecting target transfer content is received from the user of the mobile phone 300 in step S206, the controller 310 of the mobile phone 300 generates a request to provide the transfer content selected by the user. This transfer request is then transmitted to the DVR 100 by means of the baseband processor 304, the transmitter 308, the antenna duplexer 302, and the transmitting and receiving antenna 301 (step S207).

The controller 150 of the DVR 100 receives the request for transfer content from the mobile phone 300 via the network port 142 and the network I/F circuit 141 (step S308). Subsequently, the controller 150 controls the HDD 130, the mux-demux circuit 111, and the network I/F circuit 141 so as to retrieve the requested transfer content stored in the hard disk of the HDD 130, supply the retrieved content to the network I/F circuit 141 via the mux-demux circuit 111, and commence transmission of the requested transfer content to the mobile phone 300 that originated the request (step S309).

Transmission of the transfer content is continued until the requested transfer content has been completely transmitted (step S310). When the transfer is complete, the DVR 100 terminates the processing shown in FIG. 10B.

Meanwhile, the mobile phone 300 receives the transfer content transmitted from the DVR 100 by means of the transmitting and receiving antenna 301, the antenna duplexer 302, the receiver 303, and baseband processor 304. The controller 310 then supplies the received transfer content to the LCD 332 via the LCD controller 331, thereby causing video corresponding to the received transfer content to be displayed on the display screen of the LCD 332, while additionally causing sound corresponding to the received transfer content to be emitted from the one or more speakers provided in the mobile phone 300. In so doing, content corresponding to the transfer content is made available for use on the mobile phone 300 (step S208).

The processing to receive and play back the transfer content is continued until the entirety of the requested transfer content has been received and played back (step S209). When the receiving and playback is complete, the mobile phone 300 terminates the processing shown in FIG. 10A.

In this way, using the DVR 100 and the mobile phone 300 of the content usage system in accordance with the present embodiment, transfer content stored in the DVR 100 is provided to the mobile phone 300 in response to a request from the mobile phone 300, and the transfer content is subsequently made available for playback on the mobile phone 300.

Figure 10:
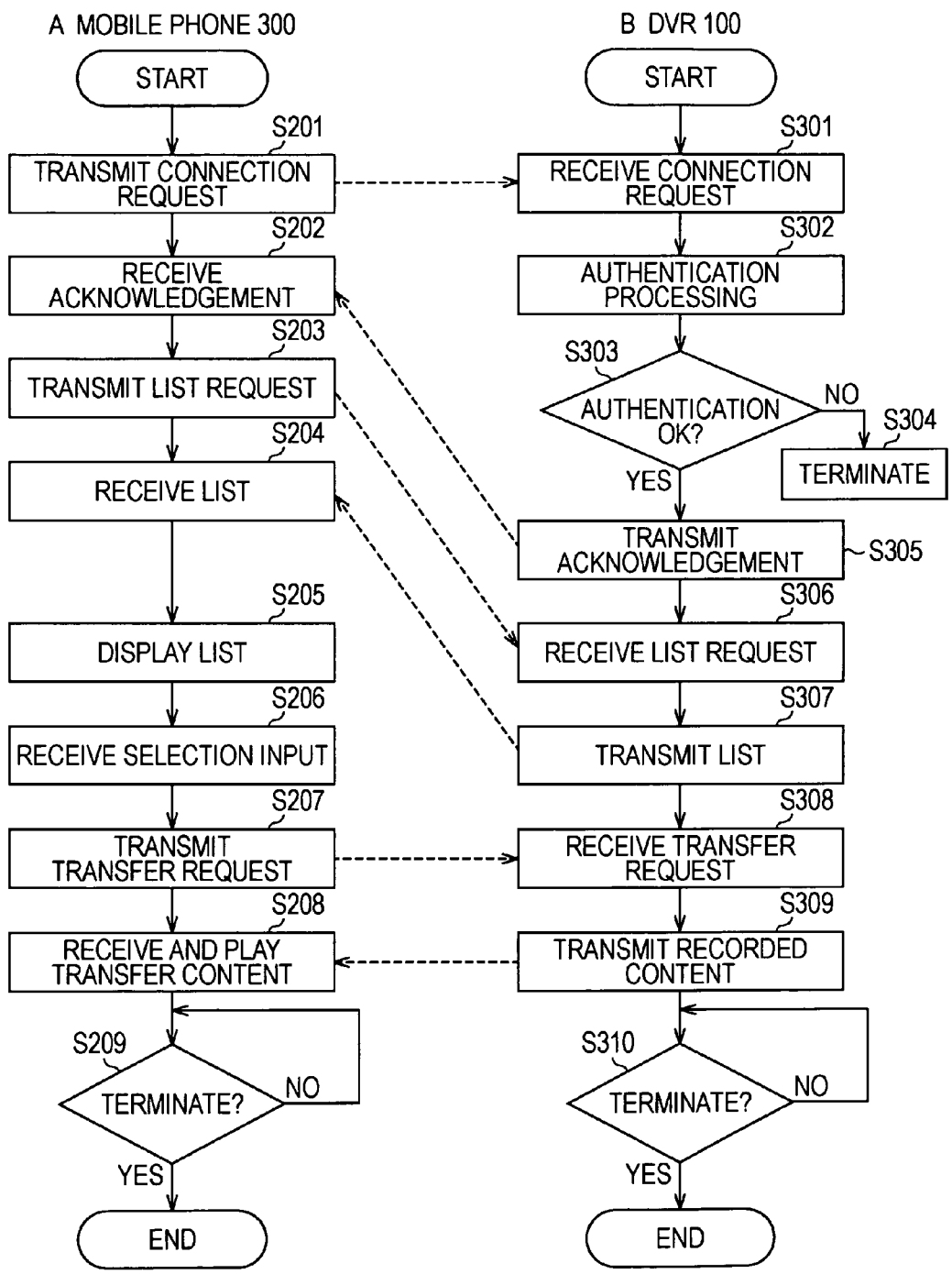
FIG. 10 is a flowchart for explaining the sending and receiving of transfer content between the DVR 100 and the mobile phone 300.

In the example shown in FIG. 10, the transmission of transfer content from the DVR 100 as well as the receiving and playing back of transfer content by the mobile phone 300 are described as being continued until completed. However, it should be appreciated that the invention is not limited thereto.

For example, in the mobile phone 300, when command input to stop playback of the transfer content is received from the user, a request to stop transmission of transfer content may be transmitted from the mobile phone 300 to the DVR 100, thereby terminating further transfer of the partially-transmitted transfer content.

Furthermore, the list of transfer content lists transfer content only, and does not include information about the regular digital content stored in the DVR 100. Consequently, the user of the mobile phone 300 is able to quickly select and receive target transfer content. Moreover, the DVR 100 only provides transfer content to the mobile phone 300.

Figure 11:
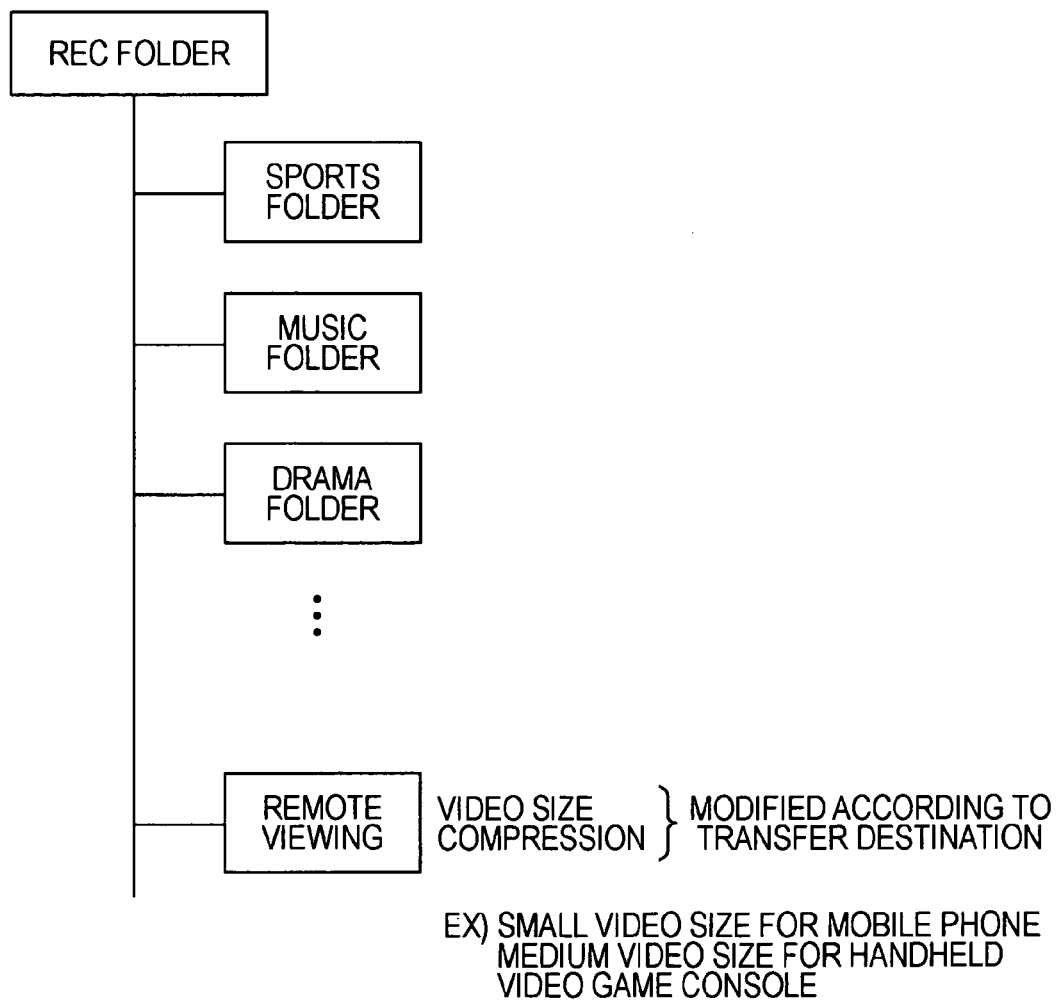
FIG. 11 is a diagram for explaining how digital content is stored in a hard disk.

FIG. 11 is a diagram for explaining how digital content is stored in the hard disk of the HDD 130 provided in the DVR 100 in accordance with the present embodiment. The DVR 100 in accordance with the present embodiment is not only able to generate and store transfer content when the mark for transfer button 177H is pressed as described above, but additionally, the DVR 100 is able to store digital content normally in the hard disk of the HDD 130 when the record button 177A is pressed, similar to a typical DVR.

Consequently, the DVR 100 is able to record digital content normally when the record button 177A. Recorded digital content may be stored as shown by way of example in FIG. 11, wherein sports programs are stored in a Sports folder, music programs are stored in a Music folder, and drama programs are stored in a Drama program. In this case, when the digital content to be recorded is a broadcast program, the DVR 100 may identify the genre to which the digital content belongs on the basis of EPG data and automatically specify a destination folder. For other types of digital content, the user may determine the destination folder, or alternatively, the genre may be identified on the basis of metadata appended to the digital content.

As described above, when the mark for transfer button 177H is pressed, transfer content is generated and recorded to the hard disk of the HDD 130. In this case, the transfer content may be stored in a Remote Viewing folder, for example, so as to differentiate the transfer content from regular digital content.

In this case, the Remote Viewing folder contains transfer content whose video size and data compression method, for example, have been modified and converted so as to match the capability of the destination mobile phone 300, the transfer content also having metadata appended thereto, as described earlier. Video size conversion may be conducted according to the portable electronic device designated as the transfer destination. For example, if the destination device is the mobile phone 300 as in the embodiment described above, then a predefined Small video size may be specified. In contrast, if the destination device is a handheld video game console having a display element with a relatively large display screen, then a predefined Medium video size may be specified.

The video size of the display screen of the display element provided in the destination device may also be specified in the DVR 100 in advance by the user.

Thus, as shown in FIG. 11, the destination folder for storing recorded digital content may be changed according to whether the digital content is regular digital content recorded as a result of normal recording processing, or transfer content generated as a result of the user pressing the mark for transfer button 177H. In so doing, the list of transfer content can be created and transmitted without having to refer to the transfer mark information contained in the metadata. As a result, transfer content can be quickly retrieved from the folder containing only transfer content and provided upon request.

Modification of the Content Usage System

The content usage system in accordance with the foregoing embodiment was described by way of example as having a single mobile phone 300 connectable to a DVR 100 via a WAN 500. However, usage of the DVR 100 may also be shared by a plurality of users. For example, usage of the DVR 100 may be shared by family members.

In such a case, transfer content is preferably generated for each user according to the respective portable electronic device used by that user. Furthermore, generated transfer content is preferably stored in a separate folder for each user, thereby enabling the DVR 100 to quickly provide transfer content according to transfer requests from respective users.

Thus, in the content usage system of the present example, the DVR 100 is assumed to be used by a plurality of family members, wherein the DVR 100 generates transfer content for each user according to the respective portable electronic device used by that user, and furthermore wherein stores and manages generated transfer content in a separate folder for each user.

The DVR 100 in accordance with the present modification will be described as a DVR having the configuration illustrated in FIG. 1. Additionally, the mobile phones or other portable electronic devices that receive transfer content from the DVR 100 will be described as fundamentally having the configuration illustrated in FIG. 5 by way of example. However, in the present modification, features such as the size of the display screen of the display element built into each device and the data compression method used are taken to be different for each portable electronic device.

Furthermore, in the present modification, the DVR 100 is assumed to include information used for generating transfer content, such as the identification information, video size, and data compression method for each portable electronic device to which transfer content can be delivered.

Consequently, the DVR 100 in accordance with the present modification is herein assumed to include information regarding the respective portable electronic devices used by the users who receive transfer content from the DVR 100. This information is specified in advance in the EEPROM 154 of the DVR 100, for example.

Figures 12, 13:
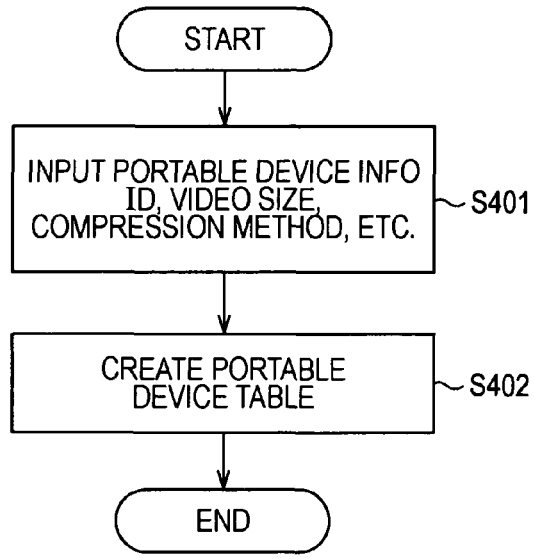
FIG. 12 is a flowchart for explaining the processing conducted when inputting portable electronic device information.
FIG. 13 is a diagram showing an exemplary portable device table.

FIG. 12 is a flowchart for explaining the processing executed by the DVR 100 in accordance with the present modification whereby portable electronic device settings are input. The processing shown in FIG. 12 may be executed by the controller 150 of the DVR 100 as a result of the user selecting a "Portable Device Settings" entry from among a menu list displayed on the display screen of the television monitor 200, the menu list having been created by the DVR 100 as the result of the user pressing the menu button 177G of the remote control 170, for example.

In this case, the controller 150 first generates a device information input screen, and then causes this input screen to be displayed on the display screen of the television monitor 200 connected to the DVR 100. The controller 150 then operates so as to receive input information regarding a target portable electronic device, such as the device ID, video size, data compression method, and other information (step S401). The device ID herein is information unique to a particular portable electronic device, such as the device's serial number, for example. The user may input the video size and the data compression method after obtaining the corresponding information in the user's manual for the device.

Besides the above method, information such as the video size and data compression method may also be acquired by inputting the model number of the portable electronic device, wherein the information to be used is subsequently extracted from device information for a plurality of portable electronic devices that has been stored in advance. Alternatively, the DVR 100 may acquire such information by accessing a predetermined server over a WAN. A variety of other, arbitrary information may also be input, such as the device user's name.

Subsequently, the DVR 100 creates a portable device table on the basis of the information received in step S401, and stores the table in the EEPROM 154 (step S402). The processing shown in FIG. 12 is then terminated.

FIG. 13 is a diagram for explaining an example portable device table created in the EEPROM 154, for example, during step S402 of the processing shown in FIG. 12. The information under the respective headings "ID", "Video Size", "Compression Method", and "Other" is the information that was input during step S401 of the processing shown in FIG. 12. The information under the "Folder Name" heading indicates the folder names where transfer content is stored. In the present case, the controller 150 automatically specifies the folder names for the folders. It should be appreciated that these folder names may also be modified by user operations.

In this way, by referring to the portable device table shown in FIG. 13, the controller 150 of the DVR 100 is able to specify the transfer content storage destination for each portable electronic device specified by a device ID. Moreover, the controller 150 is able to ascertain parameters such as the video size and the data compression method used for converting target digital content into transfer content.

In the present modification, transfer content is created from digital content as a result of the user pressing the mark for transfer button 177H on the remote control 170 while viewing the digital content by means of the DVR 100, as described earlier. However, in the present modification, information is provided to the DVR 100 before the mark for transfer button 177H is pressed, the information designating the portable electronic device that will act as the transfer destination for the transfer content to be created.

In so doing, when the user presses the mark for transfer button 177H, the controller 150 of the DVR 100 is able to specify, on the basis of the information in the portable device table shown in FIG. 13, which portable electronic device and which folder the transfer content will be generated for and stored in, respectively.

Figure 14:
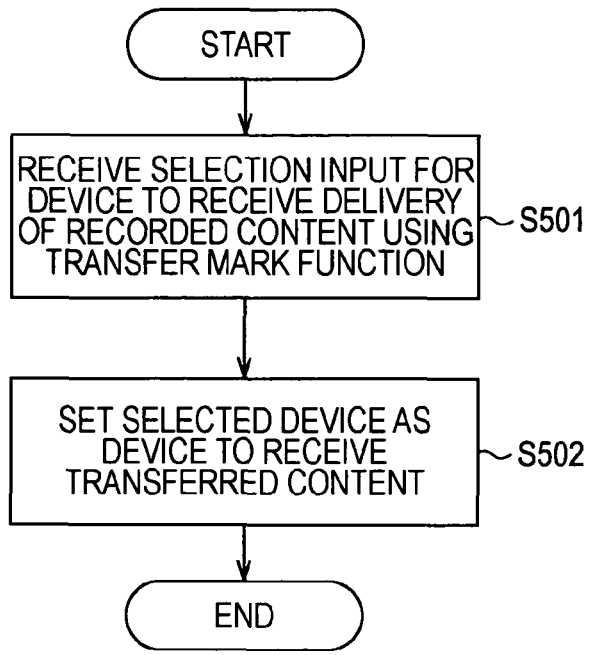
FIG. 14 is a flowchart for explaining the processing to receive selection input selecting a portable electronic device.

FIG. 14 is a flowchart for explaining the processing for receiving the selection input whereby one of the users of the DVR 100 specifies the portable electronic device that will receive subsequent transfer content. The processing shown in FIG. 14 is executed by the controller 150 of the DVR 100 as a result of the user selecting a "Select Portable Device" entry from among a menu list displayed on the display screen of the television monitor 200, the menu list having been created by the DVR 100 as a result of the user pressing the menu button 177G of the remote control 170.

Subsequently, the controller 150 operates so as to receive selection input selecting the portable electronic device to receive delivery of digital content recorded by means of the mark for transfer function (step S501). In other words, the processing in step S501 is conducted so as to input information regarding subsequent transfer content before the user presses the mark for transfer button 177H of the remote control 170. This information specifies which portable electronic device and which folder the transfer content will be generated for and stored in, respectively. Herein, the information to be input is the device ID of the target portable electronic device.

On the basis of the selection input received in step S501, the controller 150 of the DVR 100 inputs configuration information in a memory such as the EEPROM 154, the configuration information indicating that the selected portable electronic device (i.e., the device having the device ID specified in the selection input) is to be set as the transfer destination for subsequent transfer content (step S502). The processing shown in FIG. 14 is then terminated.

Thus, when the user presses the mark for transfer button 177H of the remote control 170 after the device ID of a portable electronic device has been set in the EEPROM 154 or other memory as described above, transfer content is generated according to the portable electronic device specified by the set device ID, and the generated transfer content is then stored in a folder associated with the portable electronic device specified by the set device ID.

Figure 15:
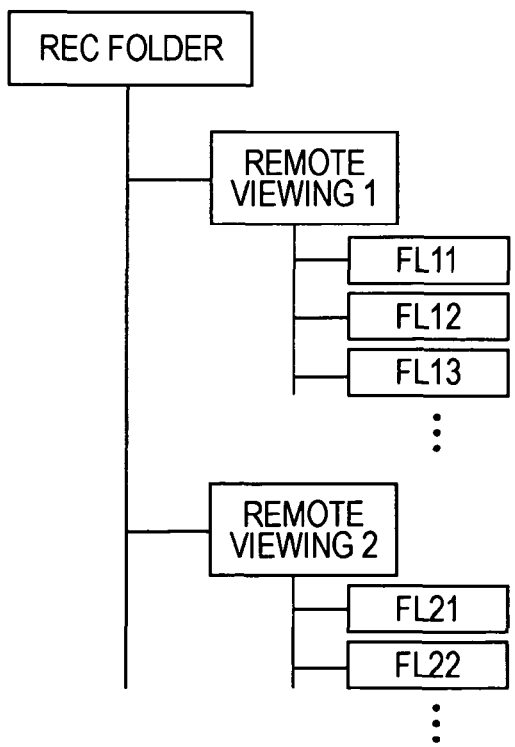
FIG. 15 is a diagram for explaining an exemplary folder structure for folders created in a hard disk.

FIG. 15 is a diagram for explaining an exemplary folder structure defined in the hard disk of the HDD 130 provided in the DVR 100 in accordance with the present modification, the folders herein being used in the case where different portable electronic devices are respectively used by a plurality of users, as described above.

For example, as shown in FIG. 13, a portable electronic device having a device ID "AAAA" as well as a portable electronic device having a device ID "BBBB" may be designated in advance as devices to receive delivery of transfer content from the DVR 100. In this case, on the basis of the information in the portable device table shown in FIG. 13, a folder named "Remote Viewing 1" is created to store transfer content for the portable electronic device corresponding to the device ID "AAAA", while a folder named "Remote Viewing 2" is created to store transfer content for the portable electronic device corresponding to the device ID "BBBB", as shown in FIG. 15.

When the portable electronic device corresponding to the device ID "AAAA" is set as the destination device for transfer content as a result of the processing shown in FIG. 14, transfer content is generated according to the video size and data compression method specified for the portable electronic device corresponding to the device ID "AAAA", and the resulting transfer content is then stored in the "Remote Viewing 1" folder. In the example shown in FIG. 15, three sets of transfer content FL11, FL12, and FL13 are stored with respect to the portable electronic device having the device ID Furthermore, when the portable electronic device corresponding to the device ID "BBBB" is set as the destination device for transfer content as a result of the processing shown in FIG. 14, transfer content is generated according to the video size and data compression method specified for the portable electronic device corresponding to the device ID "BBBB", and the resulting transfer content is then stored in the "Remote Viewing 2" folder. In the example shown in FIG. 15, two sets of transfer content FL21 and FL22 are stored with respect to the portable electronic device having the device ID "BBBB".

In the present modification, each portable electronic device able to access the DVR 100 generates and transmits various requests that contain the respective device ID of the transmitting device. In so doing, the DVR 100 is able to specify the portable electronic device that originated the requests on the basis of the device ID contained in the received requests. Furthermore, the DVR 100 is able to generate and transmit a list of transfer content associated with the specified device on the basis of the information stored in the folder that was created for the specified device. The DVR 100 is also able to extract and transmit transfer content associated with the specified device from the folder that was created for the specified device.

In other words, the DVR 100 in accordance with the present modification is able to generate and store transfer content separately for each portable electronic device by means of the processing described with reference to FIG. 9. However, during step S105 of the processing shown in FIG. 9, the DVR 100 in accordance with the present modification receives selection input as a result of the processing shown in FIG. 14. Thus, in step S105, transfer content is generated in a certain way and stored in a certain folder according to the device specified in the selection input, and on the basis of the corresponding device information specified in the portable device table shown in FIG. 13. The processing for steps other than step S105 is executed as described earlier.

In addition, in the present modification, a list of transfer content, as well as transfer content itself, are provided to a portable electronic device by the DVR 100 by means of the processing described with reference to FIG. 10. However, during step S201 of the processing shown in FIG. 10A, the portable electronic device transmits a connection request that includes the device ID of the transmitting device.

Furthermore, in step S307 of FIG. 10B, the DVR 100 creates and transmits a list of transfer content associated with the portable electronic device specified by the device ID included in the connection request received in step S301, the list being created on the basis of information stored in the folder that was created for the specified device.

Similarly, in step S309 of FIG. 10B, the DVR 100 extracts and transfers requested transfer content from the folder that was created for the portable electronic device specified by the device ID included in the connection request received in step S301.

Herein, the portable electronic device originating a request is identified using the device ID included in the connection request that is transmitted from the portable electronic device in step S201 of FIG. 10A and subsequently received by the DVR 100 in step S301 of FIG. 10B. However, it should be appreciated that the present invention is not limited to the above.

For example, the portable electronic device originating a request may also be identified in step S307 using the device ID included in the request for a list of transfer content that is transmitted from the portable electronic device in step S203 of FIG. 10A and subsequently received by the DVR 100 in step S306 of FIG. 10B.

Alternatively, the portable electronic device originating a request may also be identified in step S309 using the device ID included in the request for transfer content that is transmitted from the portable electronic device in step S207 of FIG. 10A and subsequently received by the DVR 100 in step S308 of FIG. 10B.

The foregoing description of the present modification describes the case wherein use of the DVR 100 is shared by a family. In this way, even when the DVR 100 is providing digital content to a plurality of users, the DVR 100 is able to generate suitable transfer content for each portable electronic device used by a respective user, as well as manage such transfer content by storing the transfer content in a separate folder for each portable electronic device. Furthermore, in response to a request from a particular portable electronic device, the DVR 100 is able to provide just the transfer content that has been generated for that portable electronic device, and provide such content to only that particular portable electronic device.

Furthermore, such usage is not limited to the case wherein a plurality of users share the DVR 100. Similar processing may also be conducted in the case where a single user uses a plurality of portable electronic device to view digital content that has been recorded on the DVR 100. More specifically, the DVR 100 generates separate transfer content for each portable electronic device used by the user. By managing generated transfer content on a per-device basis, transfer content optimized for individual portable electronic devices is generated, managed, and made available for use with portable electronic devices, regardless of the number of users.

In the case of the foregoing modification, the DVR 100 may be configured for use with any number of portable electronic devices by creating a portable device in advance, and then selecting and configuring a target portable electronic device before pressing the mark for transfer button 177H. However, if the portable electronic devices used with the DVR 100 are to be limited in advance, then a separate mark for transfer button for each portable electronic device may be provided on the remote control 170, for example. In so doing, the processing to select and set a target portable electronic device before pressing the mark for transfer button 177H is eliminated.

In addition, in the description of the foregoing embodiment, a mobile phone is taken to be the device that receives transfer content provided by the DVR 100. However, the present invention is not limited thereto, and a variety of portable electronic devices provided with network functions may be used, such as personal digital assistants (PDAs), handheld vide game consoles, laptop computers, and electronic organizers.

In addition, in the description of the foregoing embodiment, the content data and the metadata for particular transfer content were taken to be provided in a single file, as shown in FIG. 4. However, the present invention is not limited thereto, and the content data and metadata for particular transfer content may also be managed using separate files.

In addition, in the description of the foregoing embodiment, transfer content was described as being generated by converting the digital content being output from the DVR at the time the mark for transfer button 177H is pressed. However, the present invention is not limited to the above.

If the digital content being output is stored in a buffer or similar means before being output, then transfer content may also be generated from digital content that was output a fixed amount of time before the mark for transfer button 177H is pressed. Doing so enables the user to convert the digital content into transfer content without losing user-desired information.

Furthermore, if the digital content being played back is also being recorded to the hard disk of the HDD 130, then transfer content may be generated from digital content that was output a fixed amount of time before the mark for transfer button 177H by retrieving the recorded digital content from the hard disk of the HDD 130.

Furthermore, if the digital content being played back is content that was previously recorded or downloaded, then the DVR 100 may also be configured such that when the user presses the mark for transfer button 177H, information is applied to the already-recorded digital content in the hard disk of the HDD 130, the information indicating a clip start point and a clip stop point. After playback, the DVR 100 converts the digital content for the specified clip into transfer content on the basis of the information indicating the clip start point and the start point, and subsequently stores the transfer content thus generated.

In addition, in the above case, the information indicating the clip start point and the clip stop point may be such that the clip start point is positioned a fixed amount of time before the mark for transfer button 177H is pressed, or alternatively, at a scene change occurring before the mark for transfer button 177H is pressed.

In addition, in the foregoing embodiment, transfer content is described as being generated from target digital content (i.e., the target digital content is converted into the transfer content) on the basis of the video size and the data compression method of a particular portable electronic device. However, the present invention is not limited to the above.

Suitable transfer may also be generated by conversion from digital content according to a variety of parameters specified by the destination device. For example, the video quality of the video data in the transfer content may be adjusted according to the color depth expressible by the destination device, or the sound quality of the audio data in the transfer content may be adjusted according to the capability of the one or more speakers provided in the destination device.

Moreover, the digital content is not limited to audio-visual (AV) data. A variety of digital content may be transferred to a portable electronic device, and may include text data, game programs, or content that only contains audio data, such as music data. In the case where the digital content is a game program, the generated transfer content may be a version of the program with limited functionality to suit to the processing speed of the CPU provided in the portable electronic device.

Furthermore, since the content usage system in accordance with the foregoing embodiment does not involve downloading transfer content to the portable electronic device in advance, the recording medium of the portable electronic device is used efficiently.

In addition, in the content usage system in accordance with the foregoing embodiment, the DVR 100 and the mobile phone 300 are described as being connected via a WAN 500. However, the present invention is not limited thereto, and the invention may also be applied to cases wherein the DVR 100 and the mobile phone 300 are connectable via a preconfigured network such as a local area network (LAN).

It should be understood by those skilled in the art that various modifications, combinations, sub-combinations and alterations may occur depending on design requirements and other factors insofar as they are within the scope of the appended claims or the equivalents thereof.

What is claimed is:
1. A content usage system comprising:
a recording and playback device, having functions for recording supplied digital content on a recording medium as well as functions for playing back digital content that has been recorded on the recording medium; and
a portable electronic device, having functions for receiving and playing back digital content provided thereto; wherein
the recording and playback device and the portable electronic device are connected to each other via a predetermined network;
the recording and playback device includes
receiving means that receives command input while the recording and playback device is outputting digital content that has been supplied or previously recorded on the recording medium, the command input indicating that the digital content is to be transferred for use with the portable electronic device, converting means that, upon receiving the command input via the receiving means, converts the digital content being output into transfer content to be transferred to the portable electronic device, the conversion being conducted from a data position based on the time when the command input was received via the receiving means, recording means that records, to the recording medium, the transfer content acquired as a result of converting the digital content using the converting means, metadata processing means that generates and appends metadata to the transfer content recorded on the recording medium, the metadata including information indicating that the content is for transfer to another device, list request receiving means that receives, from the portable electronic device, a request to provide a list of transfer content, list generating means that, upon receiving the list request via the list request receiving means, generates a list of transfer content on the basis of the metadata that was appended to the transfer content by the metadata processing means, list transmitting means that transmits the list of transfer content that was generated by the list generating means to the portable electronic device that originated the list request, content provision request receiving means that receives, from the portable electronic device, a request to provide transfer content, and content transmitting means that, upon receiving the request for transfer content via the content provision request receiving means, transmits the transfer content recorded on the recording medium to the portable electronic device that originated the content provision request; and wherein the portable electronic device includes list request transmitting means that transmits, to the recording and playback device, a request to provide a list of transfer content, list receiving means that receives the list of transfer content transmitted by the recording and playback device, display controlling means that conducts control such that the list received by the list receiving means is displayed on the display screen of a display element, selection receiving means that receives selection input selecting target transfer content from among the list of transfer content displayed on the display screen of the display element as a result of the control conducted by the display controlling means, content provision request transmitting means that transmits a request to provide the transfer content that has been selected by the selection input received via the selection receiving means, and digital content receiving means that receives the transfer content transmitted from the recording and playback device and makes the received transfer content available for use.

2. The content usage system according to claim 1, wherein, when the digital content contains video data, the conversion conducted by the converting means of the recording and playback device also includes modification of the video size of the video data, the video size modification being conducted according to the portable electronic device set as the transmission destination for the transfer content.

3. The content usage system according to claim 1, wherein the conversion conducted by the converting means of the recording and playback device also includes modification of the data compression method used to compress the digital content.

4. The content usage system according to claim 1, wherein the recording and playback device further includes configuration input receiving means that receives configuration input containing identification information for a portable electronic device, the identification information being used to set the portable electronic device as the transfer destination for the transfer content, and configuration information saving means that saves information corresponding to the configuration input received via the configuration input receiving means;

the converting means converts digital content for the portable electronic device set as the destination device, the conversion being conducted on the basis of the information saved by the configuration information saving means;

the recording means records, on the recording medium, the transfer content supplied from the converting means, the recording being conducted on the basis of information saved by the configuration information saving means, and the recording being conducted in a manner indicating that the transfer content is for the portable electronic device set as the transfer destination;

the list request receiving means receives a list request containing the identification information of the portable electronic device originating the request;

the list generating means generates the list of transfer content on the basis of the identification information of the portable electronic device originating the request that was received via the list request receiving means, the list being generated by referring to the metadata of the transfer content converted for use with the portable electronic device specified by the identification information; and the list request transmitting means of the portable electronic device transmits a request to provide a list of transfer content that also contains the identification information for that device.

5. A content usage method used in a content usage system that includes a recording and playback device having functions for recording supplied digital content on a recording medium as well as functions for playing back digital content that has been recorded on the recording medium, and a portable electronic device having functions for receiving and playing back digital content provided thereto, the recording and playback device and the portable electronic device being connected to each other via a predetermined network, the method comprising the steps of:

in the recording and playback device, receiving command input while the recording and playback device is outputting digital content that has been supplied or previously recorded on the recording medium, the command input indicating that the digital content is to be transferred for use with the portable electronic device;

upon receiving the command input in the receiving step, converting the digital content being output into transfer content to be transferred to the portable electronic device, the conversion being conducted from a data position based on the time when the command input was received in the command input receiving step;

recording, on the recording medium, the transfer content acquired as a result of converting the digital content in the converting step;

generating and appending metadata to the transfer content recorded on the recording medium, the metadata including information indicating that the content is for transfer to another device;

receiving, from the portable electronic device, a request to provide a list of transfer content;

upon receiving the list request in the list request receiving step, generating a list of transfer content on the basis of the metadata that was appended to the transfer content in the generating and appending step;

transmitting the list of transfer content that was generated in the list generating step to the portable electronic device that originated the list request;

receiving, from the portable electronic device, a request to provide transfer content; and upon receiving the request for transfer content in the content provision request receiving step, transmitting the transfer content recorded on the recording medium to the portable electronic device that originated the content provision request;

in the portable electronic device, transmitting, to the recording and playback device, a request to provide a list of transfer content;

receiving the list of transfer content transmitted from the recording and playback device;

controlling a display such that the list received in the list receiving step is displayed on the display screen of a display element;

receiving selection input selecting target transfer content from among the list of transfer content displayed on the display screen of the display element as a result of the control conducted in the display controlling step;

transmitting a request to provide the transfer content that has been selected by the selection input received in the selection receiving step; and receiving the transfer content transmitted from the recording and playback device, and making the received transfer content available for use.

6. The content usage method according to claim 5, wherein, when the digital content contains video data, the conversion conducted in the converting step of the recording and playback device also includes modification of the video size of the video data, the video size modification being conducted according to the portable electronic device set as the transmission destination for the transfer content.

7. The content usage method according to claim 5, wherein the conversion conducted in the converting step of the recording and playback device also includes modification of the data compression method used to compress the digital content.

8. The content usage method according to claim 5, further comprising the steps of:

in the recording and playback device, receiving configuration input containing identification information for a portable electronic device, the identification information being used to set the portable electronic device as the transfer destination for the transfer content; and saving configuration information corresponding to the configuration input received in the configuration input receiving step; wherein in the converting step, digital content is converted for the portable electronic device set as the destination device, the conversion being conducted on the basis of the information saved in the configuration information saving step;

in the recording step, the transfer content obtained in the converting step is recorded on a recording medium on the basis of information saved in the configuration information saving step, the recording being conducted in a manner indicating that the transfer content is for the portable electronic device set as the transfer destination;

in the list request receiving step, a list request is received containing the identification information of the portable electronic device originating the request;

in the list generating step, the list of transfer content is generated on the basis of the identification information of the portable electronic device originating the request that was received in the list request receiving step, the list being generated by referring to the metadata of the transfer content converted for use with the portable electronic device specified by the identification information; and in the list request transmitting step of the portable electronic device, a request to provide a list of transfer content is transmitted that also contains the identification information for that device.

9. A recording and playback device, having functions for recording supplied digital content on a recording medium as well as functions for playing back digital content that has been recorded on the recording medium, that is used in a content usage system that includes both the recording and playback device and a portable electronic device having functions for receiving and playing back digital content provided thereto, the recording and playback device and the portable electronic device being connected to each other via a predetermined network, and the recording and playback device comprising:

receiving means that receives command input while the recording and playback device is outputting digital content that has been supplied or previously recorded on the recording medium, the command input indicating that the digital content is to be transferred for use with the portable electronic device;

converting means that, upon receiving the command input via the receiving means, converts the digital content being output into transfer content to be transferred to the portable electronic device, the conversion being conducted from a data position based on the time when the command input was received via the receiving means;

recording means that records, to the recording medium, the transfer content acquired as a result of converting the digital content using the converting means;

metadata processing means that generates and appends metadata to the transfer content recorded on the recording medium, the metadata including information indicating that the content is for transfer to another device;

list request receiving means that receives, from the portable electronic device, a request to provide a list of transfer content;

list generating means that, upon receiving the list request via the list request receiving means, generates a list of transfer content on the basis of the metadata that was appended to the transfer content by the metadata processing means;

list transmitting means that transmits the list of transfer content that was generated by the list generating means to the portable electronic device that originated the list request;

content provision request receiving means that receives, from the portable electronic device, a request to provide transfer content; and content transmitting means that, upon receiving the request for transfer content via the content provision request receiving means, transmits the transfer content recorded on the recording medium to the portable electronic device that originated the content provision request.

10. The recording and playback device according to claim 9, wherein, when the digital content contains video data, the conversion conducted by the converting means also includes modification of the video size of the video data, the video size modification being conducted according to the portable electronic device set as the transmission destination for the transfer content.

11. The recording and playback device according to claim 9, wherein the conversion conducted by the converting means also includes modification of the data compression method used to compress the digital content.

12. The recording and playback device according to claim 9, further comprising:
configuration input receiving means that receives configuration input containing identification information for a portable electronic device, the identification information being used to set the portable electronic device as the transfer destination for the transfer content; and
configuration information saving means that saves information corresponding to the configuration input received via the configuration input receiving means; wherein
the converting means converts digital content for the portable electronic device set as the destination device, the conversion being conducted on the basis of the information saved by the configuration information saving means;
the recording means records, on the recording medium, the transfer content supplied from the converting means, the recording being conducted on the basis of information saved by the configuration information saving means, and the recording being conducted in a manner indicating that the transfer content is for the portable electronic device set as the transfer destination;
the list request receiving means receives a list request containing the identification information of the portable electronic device originating the request; and
the list generating means generates the list of transfer content on the basis of the identification information of the portable electronic device originating the request that was received via the list request receiving means, the list being generated by referring to the metadata of the transfer content converted for use with the portable electronic device specified by the identification information.

13. A content delivery method used in a recording and playback device having functions for recording supplied digital content on a recording medium as well as functions for playing back digital content that has been recorded on the recording medium, the recording and playback device being used in a content usage system that includes both the recording and playback device and a portable electronic device having functions for receiving and playing back digital content provided thereto, the recording and playback device and the portable electronic device being connected to each other via a predetermined network, and the content delivery method for the recording and playback device comprising the steps of:
receiving command input while the recording and playback device is outputting digital content that has been supplied or previously recorded on the recording medium, the command input indicating that the digital content is to be transferred for use with the portable electronic device;
upon receiving the command input in the receiving step, converting the digital content being output into transfer content to be transferred to the portable electronic device, the conversion being conducted from a data position based on the time when the command input was received in the command input receiving step;
recording, on the recording medium, the transfer content acquired as a result of converting the digital content in the converting step;
generating and appending metadata to the transfer content recorded on the recording medium, the metadata including information indicating that the content is for transfer to another device;
receiving, from the portable electronic device, a request to provide a list of transfer content;
upon receiving the list request in the list request receiving step, generating a list of transfer content on the basis of the metadata that was appended to the transfer content in the generating and appending step;
transmitting the list of transfer content that was generated in the list generating step to the portable electronic device that originated the list request;
receiving, from the portable electronic device, a request to provide transfer content; and
upon receiving the request for transfer content in the content provision request receiving step, transmitting the transfer content recorded on the recording medium to the portable electronic device that originated the content provision request.

14. The content delivery method according to claim 13, further comprising the steps of:
receiving configuration input containing identification information for a portable electronic device, the identification information being used to set the portable electronic device as the transfer destination for the transfer content; and
saving configuration information corresponding to the configuration input received in the configuration input receiving step; wherein
in the converting step, digital content is converted for the portable electronic device set as the destination device, the conversion being conducted on the basis of the information saved in the configuration information saving step;
in the recording step, the transfer content obtained in the converting step is recorded on a recording medium on the basis of information saved in the configuration information saving step, the recording being conducted in a manner indicating that the transfer content is for the portable electronic device set as the transfer destination;
in the list request receiving step, a list request is received containing the identification information of the portable electronic device originating the request; and
in the list generating step, the list of transfer content is generated on the basis of the identification information of the portable electronic device originating the request that was received in the list request receiving step, the list being generated by referring to the metadata of the transfer content converted for use with the portable electronic device specified by the identification information.

15. A content delivery program executed by a computer built into a recording and playback device having functions for recording supplied digital content on a non-transitory recording medium as well as functions for playing back digital content that has been recorded on the non-transitory recording medium, the recording and playback device being used in a content usage system that includes both the recording and playback device and a portable electronic device having functions for receiving and playing back digital content provided thereto, the recording and playback device and the portable electronic device being connected to each other via a predetermined network, and the content delivery program causing the computer built into the recording and playback device to execute the steps of:

receiving command input while the recording and playback device is outputting digital content that has been supplied or previously recorded on the recording medium, the command input indicating that the digital content is to be transferred for use with the portable electronic device;

upon receiving the command input in the receiving step, converting the digital content being output into transfer content to be transferred to the portable electronic device, the conversion being conducted from a data position based on the time when the command input was received in the command input receiving step; recording, on the recording medium, the transfer content acquired as a result of converting the digital content in the converting step;

generating and appending metadata to the transfer content recorded on the recording medium, the metadata including information indicating that the content is for transfer to another device; receiving, from the portable electronic device, a request to provide a list of transfer content; upon receiving the list request in the list request receiving step, generating a list of transfer content on the basis of the metadata that was appended to the transfer content in the generating and appending step; transmitting the list of transfer content that was generated in the list generating step to the portable electronic device that originated the list request; receiving, from the portable electronic device, a request to provide transfer content; and upon receiving the request for transfer content in the content provision request receiving step, transmitting the transfer content recorded on the recording medium to the portable electronic device that originated the content provision request.

16. The content delivery program according to claim 15, the program causing the computer built into the recording and playback device to further execute the steps of:

receiving configuration input containing identification information for a portable electronic device, the identification information being used to set the portable electronic device as the transfer destination for the transfer content; and saving configuration information corresponding to the configuration input received in the configuration input receiving step; wherein in the converting step, digital content is converted for the portable electronic device set as the destination device, the conversion being conducted on the basis of the information saved in the configuration information saving step;

in the recording step, the transfer content obtained in the converting step is recorded on a recording medium on the basis of information saved in the configuration information saving step, the recording being conducted in a manner indicating that the transfer content is for the portable electronic device set as the transfer destination;

in the list request receiving step, a list request is received containing the identification information of the portable electronic device originating the request; and in the list generating step, the list of transfer content is generated on the basis of the identification information of the portable electronic device originating the request that was received in the list request receiving step, the list being generated by referring to the metadata of the transfer content converted for use with the portable electronic device specified by the identification information.

17. A content usage system comprising:

a recording and playback device, having functions for recording supplied digital content on a recording medium as well as functions for playing back digital content that has been recorded on the recording medium; and a portable electronic device, having functions for receiving and playing back digital content provided thereto; wherein the recording and playback device and the portable electronic device are connected to each other via a predetermined network;

the recording and playback device includes a receiver that receives command input while the recording and playback device is outputting digital content that has been supplied or previously recorded on the recording medium, the command input indicating that the digital content is to be transferred for use with the portable electronic device, a converter that, upon receiving the command input via the receiver, converts the digital content being output into transfer content to be transferred to the portable electronic device, the conversion being conducted from a data position based on the time when the command input was received via the receiver, a recorder that records, to the recording medium, the transfer content acquired as a result of converting the digital content using the converter, a metadata processor that generates and appends metadata to the transfer content recorded on the recording medium, the metadata including information indicating that the content is for transfer to another device, a list request receiver that receives, from the portable electronic device, a request to provide a list of transfer content, a list generator that, upon receiving the list request via the list request receiver, generates a list of transfer content on the basis of the metadata that was appended to the transfer content by the metadata processor, a list transmitter that transmits the list of transfer content that was generated by the list generator to the portable electronic device that originated the list request, a content provision request receiver that receives, from the portable electronic device, a request to provide transfer content, and a content transmitter that, upon receiving the request to provide transfer content via the content provision request receiver, transmits the transfer content recorded on the recording medium to the portable electronic device that originated the content provision request; and wherein the portable electronic device includes a list request transmitter that transmits, to the recording and playback device, a request to provide a list of transfer content, a list receiver that receives the list of transfer content transmitted by the recording and playback device, a display controller that conducts control such that the list received by the list receiver is displayed on the display screen of a display element, a selection receiver that receives selection input selecting target transfer content from among the list of transfer content displayed on the display screen of the display element as a result of the control conducted by the display controller, a content provision request transmitter that transmits a request to provide the transfer content that has been selected by the selection input received via the selection receiver, and a digital content receiver that receives the transfer content transmitted from the recording and playback device and makes the received transfer content available for use.

18. A recording and playback device, having functions for recording supplied digital content on a recording medium as well as functions for playing back digital content that has been recorded on the recording medium, that is used in a content usage system that includes both the recording and playback device and a portable electronic device having functions for receiving and playing back digital content provided thereto, the recording and playback device and the portable electronic device being connected to each other via a predetermined network, and the recording and playback device comprising:

a receiver that receives command input while the recording and playback device is outputting digital content that has been supplied or previously recorded on the recording medium, the command input indicating that the digital content is to be transferred for use with the portable electronic device;

a converter that, upon receiving the command input via the receiver, converts the digital content being output into transfer content to be transferred to the portable electronic device, the conversion being conducted from a data position based on the time when the command input was received via the receiver;

a recorder that records, to the recording medium, the transfer content acquired as a result of converting the digital content using the converter;

a metadata processor that generates and appends metadata to the transfer content recorded on the recording medium, the metadata including information indicating that the content is for transfer to another device;

a list request receiver that receives, from the portable electronic device, a request to provide a list of transfer content;

a list generator that, upon receiving the list request via the list request receiver, generates a list of transfer content on the basis of the metadata that was appended to the transfer content by the metadata processor;

a list transmitter that transmits the list of transfer content that was generated by the list generator to the portable electronic device that originated the list request;

a content provision request receiver that receives, from the portable electronic device, a request to provide transfer content; and a content transmitter that, upon receiving the request for transfer content via the content provision request receiver, transmits the transfer content recorded on the recording medium to the portable electronic device that originated the content provision request.

19. A recording and playback device comprising:

a converting portion configured to, based on a command input, convert a digital content into transfer content to be transferred to a portable electronic device, the conversion being conducted from a data position based on the time when the command input was received, a metadata processing portion configured to generate and append metadata to the transfer content, the metadata including information indicating that the content is for transfer to another device, a list request receiving portion configured to receive, from the portable electronic device, a request to provide a list of the transfer content, and a list generating portion configured to, upon receiving the list request via the list request receiving portion, generate the list of the transfer content on the basis of the metadata that was appended to the transfer content by the metadata processing portion.

* * * * *